US009883691B2

(12) United States Patent
Dierbach et al.

(10) Patent No.: US 9,883,691 B2
(45) Date of Patent: Feb. 6, 2018

(54) FOOD AND BEVERAGE PRODUCTS CONTAINING 1,3-PROPANEDIOL AND METHODS OF MODIFYING FLAVOR RELEASE USING 1,3-PROPANEDIOL

(71) Applicant: Kraft Foods Group Brands LLC, Chicago, IL (US)

(72) Inventors: Lisa Ann Dierbach, Arlington Heights, IL (US); Deborah D. Barber, Hoffman Estates, IL (US); Hui-Chen Li, San Jose, CA (US); John B. Topinka, Evanston, IL (US); Bary Lyn Zeller, Glenview, IL (US); Ryan Michael High, Evanston, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 441 days.

(21) Appl. No.: 13/791,279

(22) Filed: Mar. 8, 2013

(65) Prior Publication Data
US 2013/0295259 A1    Nov. 7, 2013

Related U.S. Application Data

(60) Provisional application No. 61/704,054, filed on Sep. 21, 2012, provisional application No. 61/609,044, filed on Mar. 9, 2012.

(51) Int. Cl.
A23L 1/22        (2006.01)
A23L 27/00       (2016.01)
A23G 4/06        (2006.01)
A23L 2/56        (2006.01)
A23G 3/36        (2006.01)
A23L 7/20        (2016.01)
A23L 27/30       (2016.01)

(52) U.S. Cl.
CPC ............... *A23L 27/86* (2016.08); *A23G 3/36* (2013.01); *A23G 4/06* (2013.01); *A23L 2/56* (2013.01); *A23L 7/20* (2016.08); *A23L 27/33* (2016.08); *A23V 2002/00* (2013.01)

(58) Field of Classification Search
CPC ..... A23L 2/56; A23L 1/22091; A23L 1/22083
See application file for complete search history.

(56) References Cited

U.S. PATENT DOCUMENTS

| 3,904,774 A | 9/1975 | Dymsza |
| 3,966,986 A | 6/1976 | Hunter |
| 3,981,774 A | 9/1976 | Hitzman |
| 3,992,147 A | 11/1976 | Christian |
| 4,058,621 A | 11/1977 | Hill |
| 4,123,589 A | 10/1978 | Korlatzki |
| 4,155,770 A | 5/1979 | Doumani |
| 4,156,742 A | 5/1979 | Babcock |
| 4,206,243 A | 6/1980 | Schlingmann |
| 4,234,613 A | 11/1980 | Lewis |
| 4,259,359 A * | 3/1981 | Spicer .............................. 426/62 |
| 4,400,390 A * | 8/1983 | Pittet et al. .................... 514/513 |
| 4,404,184 A * | 9/1983 | Pittet ......................... A23G 3/36 424/49 |
| 4,439,525 A | 3/1984 | Shay |
| 4,446,161 A | 5/1984 | Friedman |
| 4,465,702 A | 8/1984 | Eastman |
| 4,517,120 A | 5/1985 | Roychoudhury |
| 4,540,590 A | 9/1985 | Harada |
| 4,601,986 A | 7/1986 | Wegner |
| 4,774,095 A | 9/1988 | Kleinschmidt |
| 4,794,006 A | 12/1988 | Boni |
| 4,906,487 A | 3/1990 | Delmas |
| 4,997,976 A | 3/1991 | Brunengraber |
| 5,023,102 A | 6/1991 | Given, Jr. |
| 5,225,219 A | 7/1993 | Inglett |
| 5,254,673 A | 10/1993 | Cook |
| 5,286,512 A | 2/1994 | Klemann |
| 5,512,313 A | 4/1996 | Cooper |
| 5,531,982 A | 7/1996 | Gaffar |

(Continued)

FOREIGN PATENT DOCUMENTS

| CN | 101035443 | 9/2007 |
| CN | 101516966 | 8/2009 |
| CN | 101816420 | 9/2010 |
| JP | 201173979 | 4/2011 |
| JP | 2011073979 A | 4/2011 |
| WO | 2005102071 | 11/2005 |
| WO | 2007095255 | 8/2007 |
| WO | 2009076136 | 6/2009 |
| WO | 2010141889 | 9/2010 |
| WO | 2013134532 | 9/2013 |
| WO | 2013134611 | 9/2013 |

OTHER PUBLICATIONS

Jiang, B., Zhang, Z. 2010. "Volatile Compounds of Young Wines from Cabernet Sauvignon, Cabernet Gernischet and Chardonnay Varieties Grown in the Loess Plateau Region of China." Molecules. vol. 15. pp. 9184-9196.*
Di Stefano, R., Flamini, R. 2008. "Principal Parameters of Grape Ripening and Wine Fermentation." In Hyphenated Techniques in Grape and Wine Chemistry. p. 20.*
Kawai, S., Sakata, K., yagi, A., Ina, K. 1991. Identification of New Constituents of Cider Vinegar by 13C-NMR Spectroscopic Study. Agric. Biol. Chem. vol. 55. pp. 2633-2635.*

(Continued)

*Primary Examiner* — Nikki H. Dees
(74) *Attorney, Agent, or Firm* — Fitch Even Tabin & Flannery LLP

(57) ABSTRACT

Food or beverages prepared using 1,3-propanediol have shown to have modified flavor profiles, including modified flavor release, relative to an otherwise identical food product or beverage that does not include 1,3-propanediol. Inclusion of 1,3-propanediol uniquely modifies the flavor profile of these products or food ingredients in these products even when 1,3-propanediol is included in such low amounts that it does not itself contribute flavor to the product. 1,3-propanediol may be included in the food or beverage products to effect this modified flavor release, such as about 0.1 to about 2 weight percent, or in specific ratios relative to one or more flavor compounds in the product.

16 Claims, 27 Drawing Sheets

(56) References Cited

U.S. PATENT DOCUMENTS

| | | |
|---|---|---|
| 5,580,491 A | 12/1996 | Phillips |
| 5,681,505 A | 10/1997 | Phillips |
| 5,851,578 A | 12/1998 | Gandhi |
| 5,922,379 A | 7/1999 | Wang |
| 5,989,526 A | 11/1999 | Aaslyng |
| 6,017,573 A | 1/2000 | Baker |
| 6,162,475 A | 12/2000 | Hagenmaier |
| 6,183,794 B1 | 2/2001 | Kaesler |
| 6,660,311 B2 | 12/2003 | Goedeken |
| 6,709,691 B2 | 3/2004 | Skiff |
| 6,749,879 B2 | 6/2004 | Broz |
| 6,818,243 B2 | 11/2004 | Nagashima |
| 7,014,876 B2 | 3/2006 | Iwasaki |
| 7,144,592 B2 | 12/2006 | Rader |
| 7,261,769 B2 | 8/2007 | Bhaskaran |
| 7,455,872 B2 | 11/2008 | Salemme |
| 7,455,997 B2 | 11/2008 | Hughes |
| 7,582,215 B2 | 9/2009 | Hughes |
| 7,608,191 B2 | 10/2009 | Hughes |
| 7,638,155 B2 | 12/2009 | Irwin |
| 7,744,944 B2 | 6/2010 | Binder |
| 7,842,320 B2 | 11/2010 | Baydo |
| 7,867,400 B2 | 1/2011 | Hughes |
| 8,067,193 B2 | 11/2011 | Hughes |
| 8,101,223 B2 | 1/2012 | Renes |
| 2001/0018085 A1 | 8/2001 | Coutandin |
| 2003/0021883 A1 | 1/2003 | Skiff |
| 2004/0036752 A1 | 2/2004 | Botros |
| 2006/0088627 A1 | 4/2006 | Bartnick |
| 2006/0188548 A1 | 8/2006 | Mattson |
| 2006/0193960 A1 | 8/2006 | Wilson |
| 2006/0286276 A1 | 12/2006 | Salemme |
| 2007/0241306 A1 | 10/2007 | Wehner |
| 2007/0275139 A1* | 11/2007 | Joerger et al. ............ 426/321 |
| 2008/0058410 A1 | 3/2008 | Kim |
| 2008/0176957 A1 | 7/2008 | Joerger |
| 2008/0260900 A1 | 10/2008 | Wittorff |
| 2009/0035426 A1 | 2/2009 | Verrall |
| 2009/0053385 A1 | 2/2009 | Fry |
| 2009/0110798 A1 | 4/2009 | Gusek |
| 2009/0117226 A1 | 5/2009 | Hallberg |
| 2009/0155446 A1 | 6/2009 | Reiss |
| 2009/0162488 A1 | 6/2009 | Bell |
| 2009/0246330 A1 | 10/2009 | Zhong |
| 2009/0263556 A1 | 10/2009 | Blondeel |
| 2009/0297665 A1 | 12/2009 | Bromley |
| 2009/0311368 A1 | 12/2009 | Wittorff |
| 2010/0034925 A1 | 2/2010 | Pibarot |
| 2010/0069510 A1 | 3/2010 | Schafer |
| 2010/0130422 A1 | 5/2010 | Bernaert |
| 2010/0189845 A1 | 7/2010 | Grover |
| 2010/0323066 A1 | 12/2010 | Comstock |
| 2011/0151051 A1 | 6/2011 | Neergaard |
| 2011/0206802 A1 | 8/2011 | Flynn |
| 2011/0230343 A1 | 9/2011 | Schroers |
| 2011/0293789 A1 | 12/2011 | Blondeel |
| 2012/0027890 A1 | 2/2012 | Cerne |
| 2012/0107477 A1 | 5/2012 | Siegel |
| 2013/0236597 A1 | 9/2013 | Dierbach |
| 2013/0236620 A1 | 9/2013 | Herrera-Gomez |

OTHER PUBLICATIONS

Burdock. Fenaroli's Handbook of Flavor Ingredients, 5th Ed. 2005. pp. 27-28, 810.*

Burdock. Fenaroli's Handbook of Flavor Ingredients, 5th Ed. 2005. pp. 777-778.*

Ran, Huasong, et al., "The Utility and Market of 1,3-Propanial." Guangdong Chemical Industry, Oct. 2006, vol. 33, No. 162, pp. 29-36, with English Abstract.

International Patent Application No. PCT/US2013/029793, International Search Report and Written Opinion, dated Sep. 9, 2014, 8 pages.

* cited by examiner

— Propylene Glycol
- - - 1,3-Propanediol

| Level | | Least Sq Mean |
|---|---|---|
| PG,72 | A | 11283.333 |
| PG,48 | B | 10825.000 |
| PG,24 | B | 10810.000 |
| 1,3-PD,72 | C | 9700.000 |
| 1,3-PD,24 | C | 9583.333 |
| 1,3-PD,48 | C | 9341.667 |
| PG,1.5 | D | 7571.667 |
| 1,3-PD,1.5 | E | 6875.000 |

Levels not connected by same letter are significantly different.

— Propylene Glycol
- - - 1,3-Propanediol

| Level | | Least Sq Mean |
|---|---|---|
| 1,3-PD,1.5 | A | 1129.0000 |
| PG,1.5 | A | 1094.3333 |
| 1,3-PD,24 | B | 1008.0000 |
| PG,24 | B | 994.3333 |
| 1,3-PD,48 | C | 905.0000 |
| PG,48 | C | 893.3333 |
| PG,72 | C | 880.0000 |
| 1,3-PD,72 | C | 870.6667 |

Levels not connected by same letter are significantly different.

— Propylene Glycol
- - - 1,3-Propanediol

| Level | | | | | Least Sq Mean |
|---|---|---|---|---|---|
| PG,72 | A | | | | 15600.000 |
| PG,48 | A | B | | | 15506.667 |
| PG,24 | A | B | | | 15420.000 |
| 1,3-PD,24 | | B | C | | 15076.667 |
| 1,3-PD,48 | | | C | | 14810.000 |
| 1,3-PD,72 | | | C | | 14800.000 |
| PG,1.5 | | | | D | 11800.000 |
| 1,3-PD,1.5 | | | | D | 11410.000 |

Levels not connected by same letter are significantly different.

| Level | | | Least Sq Mean |
|---|---|---|---|
| PG,72 | A | | 17516.667 |
| PG,24 | A | | 17493.333 |
| PG,48 | A | B | 17383.333 |
| 1,3-PD,24 | A | B | 17285.000 |
| 1,3-PD,72 | A | B | 17283.333 |
| 1,3-PD,48 | | B | 17198.333 |
| 1,3-PD,1.5 | | | C | 16460.000 |
| PG,1.5 | | | C | 16430.000 |

Levels not connected by same letter are significantly different.

— Propylene Glycol
- - - 1,3-Propanediol

| Level | | | | Least Sq Mean |
|---|---|---|---|---|
| PG,24 | A | | | 7586.0000 |
| PG,48 | A | | | 7586.0000 |
| 1,3-PD,24 | A | B | | 7220.6667 |
| PG,72 | A | B | C | 7017.3333 |
| 1,3-PD,48 | A | B | C | 6637.6667 |
| PG,1.5 | | B | C | 6204.3333 |
| 1,3-PD,72 | | B | C | 6034.6667 |
| 1,3-PD,1.5 | | | C | 5865.6667 |

Levels not connected by same letter are significantly different.

— Propylene Glycol
- - - 1,3-Propanediol

| Level | | Least Sq Mean |
|---|---|---|
| PG,24 | A | 13678.333 |
| PG,72 | A | 13550.000 |
| PG,48 | A | 13450.000 |
| PG,1.5 | B | 12133.333 |
| 1,3-PD,24 | C | 6750.000 |
| 1,3-PD,48 | D | 5943.333 |
| 1,3-PD,72 | D | 5766.667 |
| 1,3-PD,1.5 | D | 5475.000 |

Levels not connected by same letter are significantly different.

— Propylene Glycol
- - - 1,3-Propanediol

| Level | | | | | | | Least Sq Mean |
|---|---|---|---|---|---|---|---|
| 1,3-PD,1.5 | A | | | | | | 1290.0000 |
| 1,3-PD,24 | A | B | | | | | 1226.0000 |
| PG,1.5 | A | B | C | | | | 1191.3333 |
| 1,3-PD,48 | | B | C | D | | | 1176.6667 |
| PG,24 | | | C | D | E | | 1109.3333 |
| PG,48 | | | | D | E | F | 1084.0000 |
| 1,3-PD,72 | | | | | E | F | 1063.3333 |
| PG,72 | | | | | | F | 990.0000 |

Levels not connected by same letter are significantly different.

— Propylene Glycol
- - - 1,3-Propanediol

| Level | | Least Sq Mean |
|---|---|---|
| PG,72 | A | 17713.333 |
| PG,24 | A | 17696.667 |
| 1,3-PD,24 | A | 17515.000 |
| 1,3-PD,72 | A | 17483.333 |
| 1,3-PD,48 | A | 17410.000 |
| PG,48 | A | 17393.333 |
| 1,3-PD,1.5 | B | 16376.667 |
| PG,1.5 | B | 16216.667 |

Levels not connected by same letter are significantly different.

— Propylene Glycol
- - - 1,3-Propanediol

| Level | | | | | Least Sq Mean |
|---|---|---|---|---|---|
| PG,24 | A | | | | 2400.0000 |
| PG,72 | A | B | | | 2326.6667 |
| PG,48 | A | B | C | | 2306.6667 |
| PG,1.5 | A | B | C | | 2253.3333 |
| 1,3-PD,24 | A | B | C | D | 2156.6667 |
| 1,3-PD,72 | | B | C | D | 2000.0000 |
| 1,3-PD,48 | | | C | D | 1931.6667 |
| 1,3-PD,1.5 | | | | D | 1838.3333 |

Levels not connected by same letter are significantly different.

| Level | | | | Least Sq Mean |
|---|---|---|---|---|
| PG,48 | A | | | 16266.667 |
| PG,24 | A | | | 15880.000 |
| PG,72 | A | | | 15783.333 |
| 1,3-PD,24 | | B | | 14666.667 |
| 1,3-PD,48 | | B | C | 14468.333 |
| PG,1.5 | | B | C | 14360.000 |
| 1,3-PD,72 | | | C | 13666.667 |
| 1,3-PD,1.5 | | | | D | 12710.000 |

Levels not connected by same letter are significantly different.

— Propylene Glycol
- - - 1,3-Propanediol

| Level | | | | | Least Sq Mean |
|---|---|---|---|---|---|
| PG,48 | A | | | | 4888.3333 |
| PG,24 | A | | | | 4681.6667 |
| PG,72 | A | B | | | 4460.0000 |
| 1,3-PD,24 | | B | C | | 4033.3333 |
| PG,1.5 | | B | C | | 3998.3333 |
| 1,3-PD,48 | | | C | D | 3780.0000 |
| 1,3-PD,72 | | | C | D | 3420.0000 |
| 1,3-PD,1.5 | | | | D | 3329.6667 |

Levels not connected by same letter are significantly different.

— Propylene Glycol
- - - 1,3-Propanediol

| Level | | | | Least Sq Mean |
|---|---|---|---|---|
| 1,3-PD,1.5 | A | | | 18590.000 |
| PG,1.5 | A | | | 18463.333 |
| PG,24 | | B | | 8511.667 |
| 1,3-PD,24 | | B | | 8281.667 |
| PG,48 | | | C | 4700.000 |
| 1,3-PD,48 | | | C | D | 4351.667 |
| PG,72 | | | C | D | 3673.333 |
| 1,3-PD,72 | | | | D | 3183.333 |

Levels not connected by same letter are significantly different.

— Propylene Glycol
- - - 1,3-Propanediol

| Level | | | | | Least Sq Mean |
|---|---|---|---|---|---|
| 1,3-PD,1.5 | A | | | | 15823.333 |
| PG,1.5 | A | | | | 15780.000 |
| PG,24 | | B | | | 10405.000 |
| 1,3-PD,24 | | B | | | 9945.000 |
| PG,48 | | | C | | 6071.667 |
| 1,3-PD,48 | | | C | D | 5606.667 |
| PG,72 | | | | D | E | 4693.333 |
| 1,3-PD,72 | | | | | E | 4023.333 |

Levels not connected by same letter are significantly different.

— Propylene Glycol
--- 1,3-Propanediol

| Level | | | | | Least Sq Mean |
|---|---|---|---|---|---|
| PG,24 | A | | | | 17806.667 |
| PG,72 | A | | | | 17766.667 |
| PG,48 | A | B | | | 17666.667 |
| 1,3-PD,24 | A | B | C | | 17631.667 |
| 1,3-PD,72 | | B | C | | 17400.000 |
| 1,3-PD,48 | | | C | | 17366.667 |
| PG,1.5 | | | | D | 16516.667 |
| 1,3-PD,1.5 | | | | D | 16486.667 |

Levels not connected by same letter are significantly different.

— Propylene Glycol
- - - 1,3-Propanediol

| Level | | Least Sq Mean |
|---|---|---|
| PG,24 | A | 4166.0000 |
| PG,48 | A | 4066.6667 |
| PG,72 | A | 4053.3333 |
| 1,3-PD,24 | B | 2413.3333 |
| PG,1.5 | B | 2231.6667 |
| 1,3-PD,48 | B | 2070.0000 |
| 1,3-PD,72 | B | 2036.6667 |
| 1,3-PD,1.5 | C | 1018.0000 |

Levels not connected by same letter are significantly different.

— Propylene Glycol
- - - 1,3-Propanediol

| Level | | | | | Least Sq Mean |
|---|---|---|---|---|---|
| PG,1.5 | A | | | | 614.00000 |
| 1,3-PD,1.5 | A | | | | 582.00000 |
| PG,24 | | B | | | 390.00000 |
| PG,48 | | B | C | | 378.33333 |
| PG,72 | | B | C | | 358.00000 |
| 1,3-PD,24 | | | C | D | 303.33333 |
| 1,3-PD,48 | | | | D E | 239.00000 |
| 1,3-PD,72 | | | | E | 211.00000 |

Levels not connected by same letter are significantly different.

| Level | | | | | | Least Sq Mean |
|---|---|---|---|---|---|---|
| 1,3-PD,1.5 | A | | | | | 15470.000 |
| PG,1.5 | A | | | | | 15373.333 |
| PG,24 | | B | | | | 10686.667 |
| 1,3-PD,24 | | | C | | | 9356.667 |
| PG,48 | | | | D | | 3666.667 |
| 1,3-PD,48 | | | | D | | 3326.667 |
| PG,72 | | | | | E | 2423.333 |
| 1,3-PD,72 | | | | | E | 2365.000 |

Levels not connected by same letter are significantly different.

FOOD AND BEVERAGE PRODUCTS CONTAINING 1,3-PROPANEDIOL AND METHODS OF MODIFYING FLAVOR RELEASE USING 1,3-PROPANEDIOL

CROSS REFERENCE TO RELATED APPLICATIONS

This application claims the benefit of U.S. Provisional Application No. 61/704,054, filed Sep. 21, 2012, and U.S. Provisional Application No. 61/609,044, filed Mar. 9, 2012, both of which are incorporated herein by reference in their entireties.

FIELD

This application is directed to modification of flavor profiles, flavor perception, and/or flavor release. More specifically, this application is directed to the use of 1,3-propanediol for modifying flavor profiles, flavor perception, and/or flavor release of flavor compounds in food and beverage products.

BACKGROUND 1,2-propanediol, also known as propylene glycol, is commonly included in a variety of food products. The U.S. Food and Drug Administration has classified propylene glycol as "generally recognized as safe" (GRAS) for use as a food additive. Propylene glycol is used for many purposes, including, but not limited to, as a solvent for flavorings and food colorings that are not readily soluble in water. Propylene glycol is often used as a solvent in flavorings that are used to provide flavor to a variety of food products, including flavored beverages.

Propylene glycol is also commonly used as a humectant, preservative, or stabilizer. For example, propylene glycol is used as a humectant to promote moisture retention in products like chewing gum and candy. Propylene glycol is also included in various food products to reduce the water activity of the product, thereby acting as an antimicrobial and functioning to increase shelf life of the product. Propylene glycol is also commonly used as a thickening agent in food products like ice cream and yogurt.

The use of propylene glycol is often limited by the flavor imparted by propylene glycol to the food or beverage product to which it is included. In many applications, propylene glycol is perceived by consumers as contributing an undesirable artificial flavor to the food or beverage.

Propylene glycol is structurally very similar to a variety of other compounds, including glycerol. Glycerol is often touted as being a natural alternative to propylene glycol. Glycerol is a byproduct of biodiesel production and, like propylene glycol, can be included in various food products as a humectant, solvent, filler, preservative, and thickening agent. Use of glycerol in food products can be limited by the sweet taste provided by glycerol.

Further, there has recently been an interest in using food ingredients that are perceived by consumers as being natural ingredients. Therefore, alternatives to propylene glycol would be desirable for use in food and beverage products.

SUMMARY 1,3-propanediol has been promoted for use in personal care formulations and cosmetics but is not known to be commonly used in the food industry. 1,3-propanediol is a polar compound that can be prepared from corn sugar. 1,3-propanediol generally has similar structure, molecular weight, and polarity to propylene glycol, so it was expected that 1,3-propanediol would provide similar properties and taste characteristics to propylene glycol when incorporated into food and beverage products. However, it has been surprisingly and unexpectedly found that inclusion of 1,3-propanediol in food and beverage products provides a unique impact on the flavor of the food or beverage that is significantly different from that provided by propylene glycol.

By one approach, 1,3-propanediol is included in an amount effective to modify release of a flavor compound. In one aspect, release is suppressed by at least about 10 percent, in another aspect at least about 20 percent, and in another aspect at least about 30 percent as can be measured by PTR-MS as described herein in comparison to an otherwise identical product including propylene glycol instead of 1,3-propanediol. In some approaches, modification of flavor release comprises suppression of flavor release but in other approaches, modification of flavor release may comprise increasing flavor release.

In one aspect, 1,3-propanediol may be used in food and beverage products to modify the flavor profile compared to an otherwise identical food or beverage product which does not contain 1,3-propanediol or to an otherwise identical product containing propylene glycol instead of 1,3-propanediol. In some approaches, 1,3-propanediol can be included in an amount effective to modify flavor release or flavor retention in a food or beverage product. In one form, 1,3-propanediol can be included in a food or beverage product in an amount effective to suppress release of a desired flavor or compound in the food or beverage. Inclusion of the same amount of propylene glycol does not have the same effect.

In one aspect, a food or beverage product is provided comprising about 0.1 to about 2 percent 1,3-propanediol, in another aspect about 0.1 to about 1 weight percent 1,3-propanediol, in another aspect about 0.1 to about 0.5 weight percent 1,3-propanediol, and in yet another aspect about 0.1 to about 0.3 weight percent 1,3-propanediol to modify release of a flavor compound in the food or beverage product. In one aspect, modifying flavor release comprises reducing release of that compound.

In another aspect, a food or beverage product is provided comprising a ratio of flavor compound to 1,3-propanediol of about 0.005:100 to about 15:100, in another aspect about 0.01:100 to about 5:100, in another aspect about 0.05:100 to about 5:100, and in yet another aspect about 0.1:100 to about 5:100 to modify release of a flavor compound in the food or beverage product. In one aspect, modifying flavor release comprises reducing release of that compound.

In another aspect, a method is provided for modifying release of a flavor compound from a food or beverage product, the method comprises adding about 0.1 to about 2 percent 1,3-propanediol, in another aspect about 0.1 to about 1 weight percent 1,3-propanediol, in another aspect about 0.1 to about 0.5 weight percent 1,3-propanediol, and in yet another aspect about 0.1 to about 0.3 weight percent 1,3-propanediol to a food or beverage product comprising one or more flavor compounds. In one aspect, modifying flavor release comprises reducing release of that compound.

In yet another aspect, a method is provided for modifying release of a flavor compound from a food or beverage product, the method comprises adding 1,3-propanediol to a food or beverage product comprising one or more flavor compounds at a ratio of flavor compound to 1,3-propanediol of about 0.005:100 to about 15:100, in another aspect about 0.01:100 to about 5:100, in another aspect about 0.05:100 to about 5:100, and in yet another aspect about 0.1:100 to about 5:100. In one aspect, modification of flavor release comprises suppressing flavor release. It was generally found that the highest suppression by 1,3-propandiol was detected at a flavor compound/solvent ratio of about 0.05:100 and 5:100 and diminished at the lower end of about 0.005:100 and at the higher end of about 15:100, with some exceptions.

It was found that certain classes of flavor compounds are better suppressed in the presence of 1,3-propanediol, including, for example, unsaturated and saturated aldehydes (C2-C12), saturated and unsaturated acids (C6-C12), saturated and unsaturated alcohols (C6-C12), ketones (C7-C10), ethyl esters, butyl esters, and aromatic hydrocarbons. Specific flavor compounds suppressed in the presence of 1,3-propanediol include, for example, decanoic acid, caprylic acid, caproic acid, propionic acid, acetaldehyde, butyraldehyde, propionaldehyde, hexanal, hexenal, heptanal, heptenal, octanal, citral, ethyl butyrate, ethyl caprate, ethyl decanoate, ethyl propionate, methyl butyrate, ethyl methyl butyrate, butyl butyrate, ethanol, octanol, hexanol, hexenol, heptenol, decanol, benzaldehyde, nonanone, and octanone.

The methods and compositions described herein allow for the preparation of food and beverage products having improved flavor retention compared to an otherwise identical product lacking 1,3-propanediol.

Figure 1:
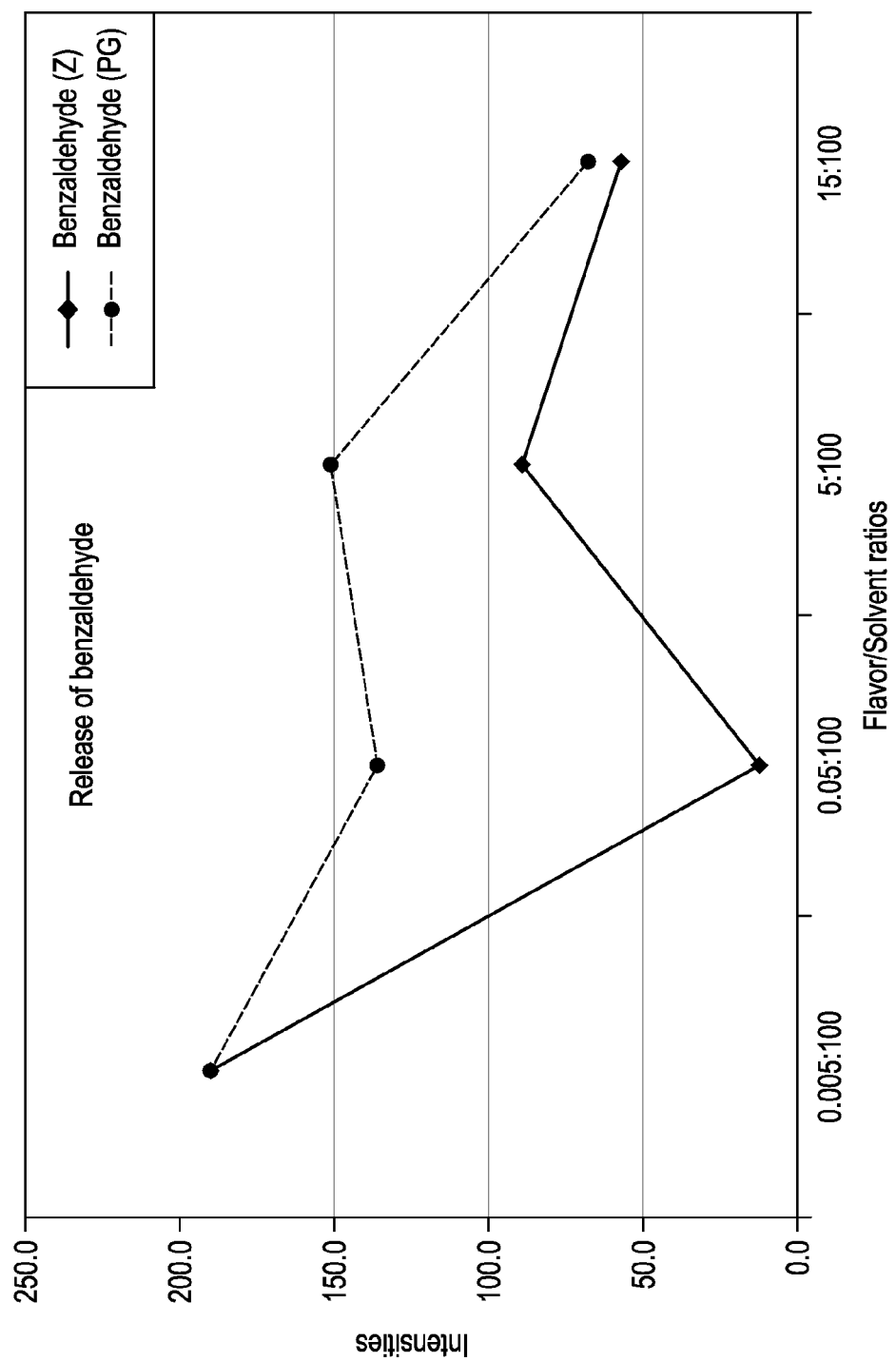
FIG. 1 is a chart showing the suppression of benzaldehyde release by 1,3-propanediol ("Z") relative to propylene glycol ("PG") at various ratios of flavor compound to 1,3-propanediol or propylene glycol.

DETAILED DESCRIPTION 1,3-propanediol has a similar structure, molecular weight, and polarity to that of 1,2-propanediol, commonly referred to as propylene glycol. Because of the similar properties, it was expected that the two compounds would be relatively interchangeable for use in food and beverage products. However, it was unexpectedly found that inclusion of 1,3-propanediol uniquely modifies the flavor profile of food products or food ingredients even when 1,3-propanediol is included in such low amounts (e.g., about 0.1 to about 2 weight percent). In one aspect, the 1,3-propanediol is included in an amount such that it does not itself contribute flavor to the product. In this respect, 1,3-propanediol functions in the beverage and food products as a flavor adjuvant, by which is meant that the 1,3-propanediol affects the flavor or perception of flavor in the food product while not acting as a flavoring ingredient itself. In one aspect, inclusion of 1,3-propanediol results in modifying flavor release of flavor compounds in the food or beverage product. In one form, the modification of flavor release comprises suppressing the release of certain flavor compounds and, more generally, classes of flavor compounds in the product.

Reducing the rate of release would mean that a greater amount of time is needed to reach a maximum level of flavor release, while "suppressing" means that the maximum flavor release is reduced. These terms are both in contrast to delaying release, which implies that there is a period of time in which no flavor is released followed by a sudden release. Therefore, as used herein, the term "suppressing flavor release" is distinguished from delaying flavor release and reducing the rate of flavor release.

In one aspect, release is suppressed by at least about 10 percent, in another aspect at least about 20 percent, and in another aspect at least about 30 percent as can be measured by PTR-MS as described herein in comparison to an otherwise identical product including propylene glycol instead of 1,3-propanediol. It does not appear that the impact on flavor release provided by 1,3-propanediol is correlated with solubility or volatility of flavor compounds in the product. It was also determined that the effect is not related to the vapor pressure of the compounds with propylene glycol versus 1,3-propanediol in aqueous systems. It was discovered that this suppression can be achieved by including 1,3-propanediol in certain percentages by weight of the food or beverage product. In another aspect, this suppression can be achieved by including 1,3-propanediol in certain ratios to the flavor compounds.

In one aspect, inclusion of 1,3-propanediol in the food or beverage product can effect flavor retention for longer periods of time during the shelf life of the product. In another aspect, 1,3-propanediol can be included in the preparation of food and beverage products, such as powdered beverage products, to assist in decreasing flavor volatilization when exposed to air during processing. 1,3-propanediol can also be included to decrease flavor release during other processing steps, such as drying steps or blending steps, when flavors may be lost. Suppressing flavor release of a food or beverage product through use of 1,3-propanediol also may allow for modification of the overall flavor perception by a consumer. Inclusion of 1,3-propanediol can also be used to suppress off-flavors in food and beverages, such as coffee with a strong ashy character.

In one approach, a food or beverage product is provided comprising about 0.1 to about 2 percent 1,3-propanediol, in another aspect about 0.1 to about 1 weight percent 1,3-propanediol, in another aspect about 0.1 to about 0.5 weight percent 1,3-propanediol, and in yet another aspect about 0.1 to about 0.3 weight percent 1,3-propanediol. The amount of 1,3-propanediol is effective to modify release of one or more flavor compounds in the food or beverage product. In one aspect, modifying flavor release comprises reducing release of that compound.

In another approach, a food or beverage product is provided comprising a ratio of flavor compound to 1,3-propanediol of about 0.005:100 to about 15:100, in another aspect about 0.01:100 to about 5:100, in another aspect about 0.05:100 to about 5:100, and in yet another aspect about 0.1:100 to about 5:100. The amount of 1,3-propanediol is effective to modify release of one or more flavor compounds in the food or beverage product. In one aspect, modifying flavor release comprises reducing release of that compound.

In another aspect, a method is provided for modifying release of a flavor compound from a food or beverage product, the method comprises adding about 0.1 to about 2 percent 1,3-propanediol, in another aspect about 0.1 to about 1 weight percent 1,3-propanediol, in another aspect about 0.1 to about 0.5 weight percent 1,3-propanediol, and in yet another aspect about 0.1 to about 0.3 weight percent 1,3-propanediol to a food or beverage product comprising one or more flavor compounds. In some approaches, the modification to flavor release comprises suppression of flavor release. Generally, inclusion of 1,3-propanediol in an amount below the lower end of the range will not result in significant flavor suppression and inclusion of 1,3-propanediol in an amount higher than the upper end of the range will result in 1,3-propanediol contributing flavor to the food or beverage product and/or will be ineffective to provide flavor suppression.

In yet another aspect, a method is provided for suppressing release of a flavor compound from a food or beverage product, the method comprises adding 1,3-propanediol to a food or beverage product comprising one or more flavor compounds at a ratio of flavor compound to 1,3-propanediol of about 0.005:100 to about 15:100, in another aspect about 0.01:100 to about 5:100, in another aspect about 0.05:100 to about 5:100, and in yet another aspect about 0.1:100 to about 5:100. Generally, inclusion of 1,3-propanediol in an amount below the lower end of the range will not result in significant flavor suppression and inclusion of 1,3-propanediol in an amount higher than the upper end of the range will result in 1,3-propanediol contributing flavor to the food or beverage product and/or will be ineffective to provide flavor suppression.

A variety of food and beverage products can be prepared using 1,3-propanediol. 1,3-propanediol is commercially sold as ZEMEA® from DuPont Tate & Lyle BioProducts (Wilmington, Del.). Other sources of 1,3-propanediol may be used as well. For example, 1,3-propanediol may be used in products, such as, but not limited to, dairy products (e.g., coffee creamer, cream cheese, processed cheese, and the like), pasta, crackers, nuts, biscuits, gelatin-based products, gum, dessert (e.g., cheesecake, pudding, whipped topping), hard candy, condiments (e.g., dressing and sauce), beverages (e.g., coffee, tea, soda, and fruit juice), powdered beverages, and beverage concentrates. It should be appreciated that this is simply an exemplary listing of food and beverages and that 1,3-propanediol may be used in a variety of other food and beverage products.

The food or beverage products described herein may include a variety of different flavors, such as, for example, fruit flavors, tea flavors, coffee flavors, dairy flavors, roasted flavors, smoke flavors, and combinations thereof. In one form, the flavor may be provided by a flavoring that includes one or more flavor compounds. The term "flavor compound," as used herein, is the component that imparts the predominant flavor to the flavoring and includes flavor agents such as essential oils, flavor essences, isolated or pure chemical compounds, flavor modifiers, flavor enhancers, and the like. The flavor compound does not include other components of the flavoring, including carriers and emulsifiers, which do not impart the predominant flavor to the flavoring.

In some approaches, 1,3-propanediol may be included in the food or beverage product in a "below threshold" amount, which means that the amount of 1,3-propanediol is below the organoleptically perceptible flavor threshold for the average consumer. Generally, 0.5 percent 1,3-propanediol by weight of water is generally considered to be below the organoleptically perceptible flavor threshold for the average consumer. Higher levels of 1,3-propanediol in a food product may also be below the organoleptically perceptible flavor threshold for the average consumer depending on the other ingredients and flavors in the food or beverage. In this aspect, the amount of 1,3-propanediol does not itself provide flavor to the food or beverage and is not perceived through taste as being included in the product. For example, when included in a below threshold amount, a comparative product containing no 1,3-propanediol is not perceptibly different in taste than a product containing 1,3-propanediol. The below threshold amount of 1,3-propanediol can also be determined by dilution in water, if desired.

When used in beverage concentrates or other products intended to be diluted or otherwise combined with additional ingredients prior to preparing a final product in consumable form, 1,3-propanediol can be used in an amount greater than the below threshold amount but the concentrated product should be formulated to provide a below threshold amount in the final product after dilution by the prescribed amount.

It was surprisingly and unexpectedly found that the below threshold amount of 1,3-propanediol is effective to modify the flavor profile of the product provided by one or more other ingredients of the food or beverage. The amount of 1,3-propanediol included in the food or beverage may vary depending on the other components of the food or beverage. In one form, 1,3-propanediol may be included in the food or beverage in an amount of about 0.1 to about 2 percent by weight of the food or beverage product to modify the flavor profile relative to food or beverages which do not contain 1,3-propanediol or which instead include the same amount of propylene glycol. In another aspect, 1,3-propanediol is included in a food or beverage in an amount of about 0.1 to about 2 weight percent. In another aspect, 1,3-propanediol is present in a food or beverage in an amount of about 0.1 to about 1 weight percent. According to one aspect, 1,3-propanediol is included in a food or beverage in an amount of about 0.1 to about 0.5 weight percent. In yet another aspect, 1,3-propanediol is included in a food or beverage in an amount of about 0.1 to about 0.3 weight percent.

In another approach, 1,3-propanediol may be included in specific ratios relative to one or more flavor compounds or classes of flavor compounds to modify the release of the flavor compounds from the food or beverage product. In one aspect, by modifying the rate of release of a flavor compound, retention of the flavor compound in a food or beverage can be improved over the shelf life of the product. In this respect, 1,3-propanediol may be used to suppress the release and thereby improve retention of flavor in the product. It has been surprisingly discovered that 1,3-propanediol is capable of causing the retention of certain flavor compounds and classes of compounds (e.g., by suppressing flavor release) in a food or beverage for longer periods of time than a comparable product lacking 1,3-propanediol or including the same amount of propylene glycol.

In one aspect, 1,3-propanediol is included in a food or beverage product at a ratio of flavor compound to 1,3-propanediol of about 0.005:100 to about 15:100 to suppress the release of one or more flavor compounds in the product. In another aspect, a ratio of flavor compound to 1,3-propanediol of about 0.01:100 to about 5:100 is provided. In another aspect, a ratio of flavor compound to 1,3-propanediol of about 0.05:100 to about 5:100 is provided. In yet another aspect, a ratio of flavor compound to 1,3-propanediol of about 0.1:100 to about 5:100 is provided.

The flavor compounds can be included in the food or beverage products in the amount needed to provide the desired flavor to the product. The particular level of the flavor compound is not particularly limiting and can be readily determined by one of ordinary skill in the art. For example, a flavor compound may be included in a food or beverage product in an amount of about 0.1 to about 10,000 ppm. In one aspect, for beverages, the level may be slightly lower, such as about 0.1 to about 5000 ppm. In another aspect, for other types of food products, the level may be about slightly higher, such as about 0.5 ppm to about 10,000 ppm. Of course lower and higher amounts of flavor compounds may be used, if desired, to meet the needs of a particular application. The ranges described herein are per flavor compound. In some approaches, the food or beverage products may include a number of different flavor compounds, with the amount of each of the flavor compounds falling within the described ranges.

Certain classes of flavor compounds are better suppressed in the presence of 1,3-propanediol. While not wishing to be bound by theory, it is presently believed that the suppressive effect of 1,3-propanediol compared to 1,2-propanediol is due to the increased occurrence of intermolecular hydrogen bonding when 1,3-propanediol is used. Though similar in structure to 1,2-propanediol, the linear geometry and terminal placement of the alcohol functional groups in 1,3-propanediol are believed to result in fewer stearic effects and may provide greater opportunity for the formation of intermolecular hydrogen bonds. For example, 1,3-propanediol has been found to suppress the release of unsaturated and saturated aldehydes (C2-C12), saturated and unsaturated acids (C6-C12), saturated and unsaturated alcohols (C6-C12), ketones (C7-C10), ethyl esters, butyl esters, and aromatic hydrocarbons.

Specific flavor compounds suppressed in the presence of 1,3-propanediol include, for example, decanoic acid, caprylic acid, caproic acid, propionic acid, acetaldehyde, butyraldehyde, propionaldehyde, hexanal, hexenal, heptanal, heptenal, octanal, citral, ethyl butyrate, ethyl caprate, ethyl propionate, methyl butyrate, ethyl methyl butyrate, butyl butyrate, ethanol, octanol, hexanol, hexenol, heptenol, decanol, benzaldehyde, nonanone, and octanone.

It was generally found that the highest suppression by 1,3-propanediol was detected at a flavor compound to 1,3- propanediol ratio of about 0.05:100 and diminished at the lower end of about 0.005:100 and at the higher end above about 15:100, although citral and acetaldehyde were still suppressed at a ratio of flavor compound to 1,3-propanediol of about 0.005:100. When used in a beverage or food concentrate, the amount of 1,3-propanediol may be increased relative to the ratios described above but the 1,3-propanediol should still be included in an amount such that, when diluted by the intended factor, the described ratios of flavor compound to 1,3-propanediol are provided in the final beverage or food product in consumable form.

By one approach, 1,3-propanediol may be used in beverage concentrates that are diluted to prepare a final beverage. As used herein, the term "concentrate" means a powdered or liquid composition that can be diluted with an aqueous, potable liquid to prepare a beverage. Concentrates can also be added to various food products to add flavor to the food product. The phrase "liquid" refers to a non-gaseous, flowable, fluid composition at room temperature (i.e., about 20° C.). 1,3-propanediol may also be included in ready-to-drink beverages. Suitable beverages include, but are not limited to, coffee, tea, milk, fruit juice (e.g., apple, grape, and orange juice), vegetable juice, carbonated beverage, cola, energy drink, sports drink, and the like. For instance, the concentrate could be a liquid beverage concentrate, a powdered beverage concentrate, a liquid coffee concentrate, or a dried instant coffee product.

In another form, the concentrate in which 1,3-propanediol is included may be formulated to be combined with other food ingredients at a ratio of at least about 1:2 for preparation of a final food product, including but not limited to pudding, ice cream, gelatin, and other desserts and confections.

By some approaches, the concentrate in which 1,3-propanediol is included may be formulated to be diluted by a factor of at least 5 times to provide a final beverage in ready-to-drink strength, which can be, for example, an 8 ounce beverage. The concentrate for use in food or beverages can be provided at a concentration of about 5 to about 500 times, in another aspect about 25 to about 225 times, in another aspect about 50 to about 200 times, in another aspect about 75 to about 160 times, and in yet another aspect about 90 to about 140 times that needed to provide a desired level of flavor intensity, acidity, and/or sweetness to a final beverage, which can be, for example, an 8 ounce beverage. The term "final beverage" or "final product" as used herein means a beverage or food product that has been prepared by diluting or otherwise combining the concentrate with one or more other ingredients to provide a beverage or food product in a potable or consumable form. In some aspects, the concentrate may be non-potable due to acidulant content and/or flavor intensity. By way of example to clarify the term "concentration," a concentration of 75 times (i.e., "75×") would be equivalent to 1 part concentrate to 74 parts water (or other potable liquid) to provide the final beverage. In other words, the flavor profile of the final beverage is taken into account when determining an appropriate level of dilution, and thus concentration, of the liquid beverage concentrate. The dilution factor of the concentrate can also be expressed as the amount necessary to provide a single serving of concentrate.

The food or beverages including 1,3-propanediol may be prepared in a conventional manner, such as by mixing 1,3-propanediol with the remaining ingredients. It is not believed to be necessary to mix the 1,3-propanediol with the flavor compound prior to mixing with additional ingredients in the food or beverage. However, by one approach, the 1,3-propanediol is pre-mixed with one or more flavor compounds prior to mixing with one or more additional ingredients to provide the beverage or food product.

The impact of 1,3-propanediol on the release of flavor compounds can be analyzed by Proton Transfer Reaction Mass Spectrometry (PTR-MS; model TOF-8000 from Ionicon Analytik Inc.), where real-time headspace release of volatiles is measured. A sampling apparatus is needed in conjunction with the PTR-MS inlet to prevent variations caused by headspace kinetics. By one exemplary approach, the sampling apparatus includes a 4 ounce sample vessel equipped with a 2-hole lid which may be sealed by an adhesive film to allow equilibration. One hole is designated for sampling and the second hole is designated for entry of a dilution gas (e.g., ambient air uncontaminated by volatiles of interest). The holes are equal sized (~2 mm diameter) and match the outer diameter of the PTR-MS inlet line. The flow of the dilution gas into the vessel is regulated by the vacuum and proportional valve of the PTR-MS inlet system. The sample vessel has a base diameter of 47 mm and is 45 mm high, of which 8 mm of height is occupied by the sample in the vessel in these experiments. The 2 holes in the lid are equidistant from the edge of the vessel (~20 mm) and about 30 mm from each other. The PTR-MS inlet is braced by clamps in a fixed position vertically above the laboratory bench (~55 mm) and a silicone rubber depth gauge is affixed to the PTR-MS inlet tubing and set at 18 mm. The PTR-MS inlet is thus consistently oriented in a vertical position 18 mm below the inside lid of the vessel and 19 mm above the sample in the vessel. The sample vessel is then held in place during sampling according to the depth gauge on the inlet line and the vessel is subsequently supported on the bench by a 10 mm plastic spacer.

15 grams of the sample to be tested (e.g., food or beverage product containing 1,3-propanediol) are added to the vessel. The vessel is sealed and allowed to equilibrate at room temperature (~22° C.) for 90 minutes. At the time of sampling, the seal is removed from both the sampling hole and the dilution gas hole in the lid and the vessel is immediately affixed to the PTR-MS inlet via the sampling hole. The real-time released flavor is measured from the headspace of the sample vessel for two minutes (according to the conditions listed in Table 1 below). A comparative sample is prepared that is otherwise identical to the test sample but contains propylene glycol or water instead of 1,3-propanediol. The comparative sample is then analyzed in triplicate by PTR-MS using the above-described procedure. The data can be analyzed using PTR-MS Viewer, Version 3.0.0.101 (Ionicon Analytik G.m.b.H). The point of maximum intensity for each compound of interest can be determined and recorded according to the PTR-MS Viewer software. The maximum intensity in counts over the timescale for each compound of interest can be used for data analysis as it reflects the static equilibrium headspace concentration in the system at the moment of seal removal. Due to the necessity of a dilution gas, the volatile concentration decreases over time as the compounds of interest re-equilibrate to a state of dynamic equilibrium in the headspace.

By one approach, 1,3-propanediol is included in an amount effective to modify release of a flavor compound. In one aspect, flavor release of one or more flavor compounds is modified by at least about 10 percent, in another aspect by at least about 20 percent, in another aspect by at least about 30 percent, and in yet another aspect modified by at least about 40 percent as compared to an otherwise identical composition including propylene glycol instead of 1,3-propanediol. In some approaches, modification of flavor release comprises suppression of flavor release but in other approaches, modification of flavor release may comprise increasing rate of flavor release as shown in the accompanying examples. Modification of flavor release can be determined by PTR-MS after the 90 minute equilibration according to the method described above and calculated according to formula I below:

$$(I_Z - I_{PG})/I_{PG} \times 100, \quad \text{(formula I)}$$

where I is peak height, Z is 1,3-propanediol, and PG is propylene glycol.

TABLE 1

PTR-MS parameters for reaction chamber and inlet in H3O+ mode.

| PTR-MS Parameter | Setpoint |
| --- | --- |
| PC Inlet | 168 mbar |
| p Drift | 2.2 mbar |
| TOF lens: | $7.18 \times 10^{-6}$ mbar |
| SV | 55% |
| H2O | 5.5 sccm |
| O2 | 0 |
| NO | 0 |
| Us | 110 V |
| Uso | 80 V |
| Udrift | 600 V |
| Uql | 35 V |
| Ihc | 5.0 mA |
| FCinlet | 100 sccm |
| Tdrift | 85° C. |
| Tinlet | 80° C. |

Flavor Compounds

Flavorings containing flavor compounds useful in the products described herein may include, for example, liquid flavorings (including, for example, alcohol-containing flavorings (e.g., flavorings containing ethanol, propylene glycol, 1,3-propanediol, glycerol, or combinations thereof) and flavor emulsions (e.g., nano- and micro-emulsions)) and powdered flavorings (including, for example, plated, extruded, spray-dried, agglomerated, freeze-dried, and encapsulated flavorings). The flavorings may also be in the form of an extract, such as a fruit extract. The flavorings can be used alone or in various combinations to provide the food or beverage with a desired flavor profile. A variety of commercially-available flavorings can be used, such as those sold by Givaudan (Cincinnati, Ohio), International Flavors & Fragrances Inc. (Dayton, N.J.), and Firmenich Inc. (Plainsboro, N.J.).

Extruded and spray-dried flavorings often include a large percentage of flavor compound and carrier, such as corn syrup solids, maltodextrin, gum arabic, starch, and sugar solids. Extruded flavorings can also include small amounts of alcohol and emulsifier, if desired. Flavor emulsions can also include carriers, such as, for example, starch. In one aspect, the flavor emulsion does not include alcohol. In other aspects, the flavor emulsion may include low levels of alcohol (e.g., propylene glycol, 1,3-propanediol, and ethanol). A variety of emulsifiers can be used, such as but not limited to sucrose acetate isobutyrate and lecithin, and an emulsion stabilizer may be included, such as but not limited to gum acacia. Micro-emulsions often include a higher concentration of flavor compound and generally can be included in lesser quantities than other flavor emulsions. Flavor emulsions include, for example, lemon, orange oil lemonade, lemon oil lemonade, pink lemonade, floral lemonade, orange, grapefruit, grapefruit citrus punch, and lime from Givaudan (Cincinnati, Ohio). Of course, other flavor emulsions or types of emulsions, including nano- or micro-emulsions, may be used, if desired.

A variety of suitable alcohol-containing flavorings may be included in the food or beverage, if desired. Solvents typically used in commercially available flavorings include compounds having one or more hydroxyl groups, such as ethanol and propylene glycol, although others may be used, if desired. Suitable alcohol-containing flavorings include, for example, lemon, lime, cranberry, apple, watermelon, strawberry, pomegranate, berry, cherry, peach, passionfruit, mango, punch, white peach tea, sweet tea, and combinations thereof. Other alcohol-containing flavorings may be used, if desired.

With respect to powdered flavorings, the form of the powdered flavorings is not particularly limited and can include, for example, spray-dried, agglomerated, extruded, freeze-dried, and encapsulated flavorings. Other powdered flavorings may also be used, if desired.

Other Flavor Modifications by 1,3-Propanediol

In other approaches, 1,3-propanediol can be used to modify other aspects of the flavor of a food or beverage depending on the other ingredients of the food or beverage. The food or beverage may also include a variety of other components such as acids, preservatives, and the like. For example, 1,3-propanediol may be used with products containing acids to modify the acid profile thereby modifying the taste of the product. In one aspect, in a beverage including at least one acid, 1,3-propanediol may be included in an amount of about 0.1 to about 1 percent by weight of the product to modify the acid profile. In another aspect, when used with acids, such as in a beverage, the ratio of acid to 1,3-propanediol is about 1:2 to about 4:1. In one form, an acid included in the food or beverage can include, for example, any food grade organic or inorganic acid, such as but not limited to citric acid, malic acid, succinic acid, acetic acid, hydrochloric acid, adipic acid, tartaric acid, fumaric acid, phosphoric acid, lactic acid, salts thereof, and combinations thereof. The selection of the acid may depend, at least in part, on the desired pH of the food or beverage and/or taste imparted by the acid to the diluted final beverage. In another aspect, the amount of acid included in the food or beverage may depend on the strength of the acid. For example, a larger quantity of lactic acid would be needed in the food or beverage to reduce the pH in the food or beverage than a stronger acid, such as phosphoric acid.

1,3-propanediol may be used with food or beverages having a terpene-containing component to modify the bitterness flavor profile. In one aspect, 1,3-propanediol may be included in an amount of about 0.1 to about 1 percent by weight of the product to modify the bitterness of the product. In another aspect, the ratio of the terpene-containing component to 1,3-propanediol is about 1:5 to about 20:1.

Advantages and embodiments of the food and beverage products containing 1,3-propanediol described herein are further illustrated by the following examples; however, the particular conditions, processing steps, materials, and amounts thereof recited in these examples, as well as other conditions and details, should not be construed to unduly limit the described methods and compositions. All percentages are by weight unless otherwise indicated.

EXAMPLES

Examples were prepared using 1,3-propanediol to analyze the impact of 1,3-propanediol on flavor profile or flavor release modification in various food and beverage systems.

Example 1

A watermelon flavored concentrate was prepared by combining the compounds listed in Table 2 below to analyze impact on flavor release by 1,3-propanediol relative to propylene glycol. Sample A was prepared with 20 grams watermelon flavor concentrate and 80 grams propylene glycol. Sample B was prepared with 20 grams watermelon flavor concentrate and 80 grams 1,3-propanediol. Each of the samples was further diluted by adding 0.08 grams of each diluted concentrate to 99.92 grams water to provide a flavor water solution.

Samples were prepared by adding 1 gram of flavor water solution at 160 ppm concentration into a 2 ounce sample cup with 2-hole punched lid and equilibrated for 90 minutes before analysis.

The diluted samples were analyzed by Proton Transfer Reaction Mass Spectrometry (PTR-MS; model TOF-8000 from Ionicon Analytik Inc.) for real-time headspace release volatiles measurement. Samples were analyzed in triplicate. Samples were analyzed in triplicate. Samples were prepared by adding 1 gram of flavor water solution at 8 ppm concentration into a 2 oz. sample cup with 2-hole punched lid and equilibrated for 90 minutes before analysis. The mean of the three samples are presented in Table 2.

As shown in Table 2 above, inclusion of 1,3-propanediol generally resulted in increased flavor retention compared to use of propylene glycol. Further, based on the results, there does not appear to be a correlation between boiling point or solubility of the flavor compound and flavor release. Therefore, neither the boiling point nor the logP can be used to predict the change in flavor release.

Example 2

The compounds listed below in Table 3 were added together to provide a liquid flavoring to analyze the role, if any, of the amount of 1,3-propanediol on flavor release. The liquid flavoring was combined with various amounts of propylene glycol or 1,3-propanediol, as shown in Table 3 below, and then diluted in water for analysis. The amount of each flavor compound in the beverage was held constant at 8 ppm except furfuryl mercaptan was included at 1.6 ppm while the amount of propylene glycol or 1,3-propanediol varied.

TABLE 2

| Watermelon Flavor Model Formulation | PPM of Each Compound (in 0.08 Grams) | Boiling Point | logP (o/w) | Sample A (PG) Mean | Sample B (1,3-propanediol) Mean | Percent Release Difference |
|---|---|---|---|---|---|---|
| 2-methylbutyl acetate | 19.00 | 140.00° C. @ 760.00 mm Hg | 2.12 (est) | 5.30 | 4.27 | −19.5 |
| 2,6-dimethyl-5-heptenal and Cis-6 Nonenal | 13.21 | 116.00-124.00° C. @ 100.00 mm Hg | 3.00 (est) | 25.33 | 25.17 | −0.7 |
| Acetaldehyde (50% in ethanol) | 53.94 | 20.00-21.00° C. @ 760.00 mm Hg | −0.16 | 803.33 | 877 | 9.1 |
| Ethanol 95%/190 proof | 34.72 | 78.00-79.00° C. @ 760.00 mm Hg | −0.19 | 22.17 | 24.50 | 10.5 |
| Aldehyde C-16 (ethyl methylphenyl-glycidate) | 18.17 | 272.00-275.00° C. @ 760.00 mm Hg | 2.43 (est) | 0.69 | 0.53 | −24.0 |
| Alpha damascone | 1.35 | 266.00-267.00° C. @ 760.00 mm Hg | 3.91 (est) | 0.82 | 0.57 | −30.6 |
| Benzaldehyde | 4.54 | 178.00-179.00° C. @ 760.00 mm Hg | 1.48 | 39.67 | 32.00 | −19.3 |
| Cyclamen aldehyde | 4.13 | 270.00° C. @ 760.00 mm Hg | 3.72 (est) | 0.40 | 0.36 | −10.0 |
| Ethyl acetate | 153.23 | 76.50-77.50° C. @ 760.00 mm Hg | 0.71 (est) | 1797 | 1410 | −21.5 |
| Ethyl butyrate | 369.73 | 120.00-121.00° C. @ 760.00 mm Hg | 1.85 (est) | 10983 | 5827 | −46.9 |
| Ethyl formate | 13.46 | 52.00-54.00° C. @ 760.00 mm Hg | 0.23 | 50.50 | 41.67 | −17.5 |
| Ethyl maltol | 22.71 | 289.00-290.00° C. @ 760.00 mm Hg | 0.61 (est) | 1.25 | 1.25 | 0.0 |
| Ethyl vanillin and methyl o-methoxy benzoate | 14.04 | 285.00-294.00° C. @ 760.00 mm Hg | 1.72 (est) | 0.30 | 0.26 | −11.8 |
| Hexyl cinnamic aldehyde | 3.72 | 174.00-176.00° C. @ 15.00 mm Hg | 5.33 (est) | 0.95 | 1.32 | 38.8 |
| Phenyl acetaldehyde | 1.24 | 193.00-195.00° C. @ 760.00 mm Hg | 1.78 (est) | 0.80 | 0.78 | −2.5 |
| Raspberry ketone | 18.17 | 200.00° C. @ 760.00 mm Hg | 0.94 (est) | 0.07 | 0.04 | −48.1 |
| Trans-2-hexenoic acid | 0.12 | 28.00-34.00° C. @ 760.00 mm Hg | 1.87 (est) | 1.06 | 0.86 | −18.3 |
| Vanillin | 54.52 | 285.00-286.00° C. @ 760.00 mm Hg | 1.19 (est) | 0.05 | 0.05 | 3.4 |

TABLE 3

| Compound | Dilution 1 (0.005:100)* | Dilution 2 (0.01:100)* | Dilution 3 (0.05:100)* | Dilution 4 (5:100)* | Dilution 5 (10:100)* | Dilution 6 (15:100)* |
| --- | --- | --- | --- | --- | --- | --- |
| Acetic Acid | 0.005 | 0.01 | 0.05 | 5.00 | 10.00 | 15.00 |
| Butyric Acid | 0.005 | 0.01 | 0.05 | 5.00 | 10.00 | 15.00 |
| Decanoic Acid | 0.005 | 0.01 | 0.05 | 5.00 | 10.00 | 15.00 |
| Acetaldehyde | 0.005 | 0.01 | 0.05 | 5.00 | 10.00 | 15.00 |
| Octanal | 0.005 | 0.01 | 0.05 | 5.00 | 10.00 | 15.00 |
| Citral (3,7-dimethyl-2,6-octadienal) | 0.005 | 0.01 | 0.05 | 5.00 | 10.00 | 15.00 |
| Isovaleraldehyde | 0.005 | 0.01 | 0.05 | 5.00 | 10.00 | 15.00 |
| Ethyl Butyrate | 0.005 | 0.01 | 0.05 | 5.00 | 10.00 | 15.00 |
| Ethyl Caprate | 0.005 | 0.01 | 0.05 | 5.00 | 10.00 | 15.00 |
| Butyl Butyrate | 0.005 | 0.01 | 0.05 | 5.00 | 10.00 | 15.00 |
| Ethanol | 0.005 | 0.01 | 0.05 | 5.00 | 10.00 | 15.00 |
| Octanol | 0.005 | 0.01 | 0.05 | 5.00 | 10.00 | 15.00 |
| Hexanol | 0.005 | 0.01 | 0.05 | 5.00 | 10.00 | 15.00 |
| Benzaldehyde | 0.005 | 0.01 | 0.05 | 5.00 | 10.00 | 15.00 |
| Guaiacol | 0.005 | 0.01 | 0.05 | 5.00 | 10.00 | 15.00 |
| Furfuryl Mercaptan | 0.0005 | 0.001 | 0.01 | 0.50 | 1.00 | 1.50 |
| Tetramethyl Pyrazine | 0.005 | 0.01 | 0.05 | 5.00 | 10.00 | 15.00 |
| Limonene | 0.005 | 0.01 | 0.05 | 5.00 | 10.00 | 15.00 |
| 1,3-propanediol or PG | 100 | 100.00 | 100.00 | 100.00 | 100.00 | 100.00 |

*The name of each dilution refers to the amount of each individual compound, except furfuryl mercaptan, within the dilution relative to the amount of 1,3-propanediol or PG.

The resulting beverages were evaluated organoleptically. The results are presented in Table 4 below.

TABLE 4

| Ratio | Organoleptic Evaluation |
| --- | --- |
| 0.005:100 PG | Waxy, extremely bitter, peely citrus, not as bitter as propylene glycol but still bitter, smoky |
| 0.005:100-1,3-propanediol | Very bitter, citrus, waxy, smoky |
| 0.01:100-PG | Coffee, bitter, peely, bitter, intense waxy, dark note |
| 0.01:100-1,3-propanediol | Citrus, bitter, burnt, sweeter, less flavor than propylene glycol, melon-like, less peely than propylene glycol |
| 0.05:100-PG | Coffee upfront, bitter, peely, peely orange, burnt, smoky, coffee |
| 0.05:100-1,3-propanediol | Fresh citrus, limonene-like, fatty (C-8-C-10 aldehyde), mild coffee, mild smoky, more citrus |
| 5:100-PG | Coffee, then peely citrus, no bitter |
| 5:100-1,3-propanediol | Stronger coffee than propylene glycol, lingering coffee, limonene aftertaste |
| 10:100-PG | Citrus, peely, coffee aroma |
| 10:100-1,3-propanediol | Brown citrus, mild coffee (tasted more similar to 10:100 PG than to 5:100 1,3-propanediol) |
| 15:100-PG | Peely citrus, no coffee |
| 15:100-1,3-propanediol | Peely citrus, slightly fresher than propylene glycol, no coffee *very similar to propylene glycol |

The impacts of 1,3-propanediol on flavor release of the compounds in the liquid flavoring were evaluated by PTR-MS as described above in Example 1. The results are presented below in Table 5.

TABLE 5

| | Percent Suppression by 1,3-propanediol | | | |
| --- | --- | --- | --- | --- |
| | 0.005:100 | 0.05:100 | 5:100 | 15:100 |
| Acids | | | | |
| Acetic acid | −0.5 | −27.7 | −1.7 | −9.0 |
| Butyric acid | 7.5 | 8.0 | −18.4 | −6.0 |
| Decanoic acid | −7.3 | −20.0 | −12.5 | −17.1 |
| Aldehydes | | | | |
| Acetaldehyde | −22.1 | −37.3 | −57.4 | 64.5 |
| Octanal | 2.6 | −10.5 | −21.1 | −2.5 |

TABLE 5-continued

| | Percent Suppression by 1,3-propanediol | | | |
| --- | --- | --- | --- | --- |
| | 0.005:100 | 0.05:100 | 5:100 | 15:100 |
| Citral | −70.0 | −69.0 | −45.4 | −58.2 |
| Isovaleraldehyde | 3.7 | −1.3 | −22.2 | −2.6 |
| Esters | | | | |
| Ethyl butyrate | 3.2 | 14.9 | −21.8 | −3.3 |
| Ethyl decanoate | −2.0 | 41.9 | 17.8 | −12.4 |
| Butyl butyrate | −3.3 | 29.2 | −20.5 | −8.2 |
| Alcohols | | | | |
| Ethanol | 11.9 | −34.8 | −12.1 | −0.9 |
| Hexanol | −3.6 | −45.9 | −9.8 | −20.0 |
| Octanol | 8.5 | −11.4 | −19.1 | −0.6 |
| Cyclic compounds | | | | |
| Benzaldehyde | −0.5 | −90.3 | −40.6 | −16.2 |
| Limonene | −0.1 | −25.2 | −34.8 | 23.5 |
| Guaiacol | −3.4 | −48.1 | −19.9 | 0.2 |
| Furfuryl mercaptan | 31.8 | 7.8 | 15.9 | −13.1 |
| Tetramethyl pyrazine | 10.2 | −44.6 | −17.8 | −5.6 |

The percent suppression was calculated using the following formula:

$$(I_Z - I_{PG})/I_{PG} \times 100,$$

where I is peak height, "Z" is 1,3-propanediol and "PG" is propylene glycol.

For the analysis of this example, 10% was used as the cut-off for considering the change in flavor release to be significantly different.

It was found that compounds whose release was suppressed in the presence of 1,3-propanediol included citral, benzaldehyde, acetaldehyde, guiacol, ethanol, hexanol, tetramethyl pyrazine, limonene, and acetic acid.

When using a flavor/1,3-propanediol ratio of 0.05:100 and 5:100, 1,3-propanediol had a significant suppression effect on the release of benzaldehyde as shown in FIG. 1.

Figure 2:
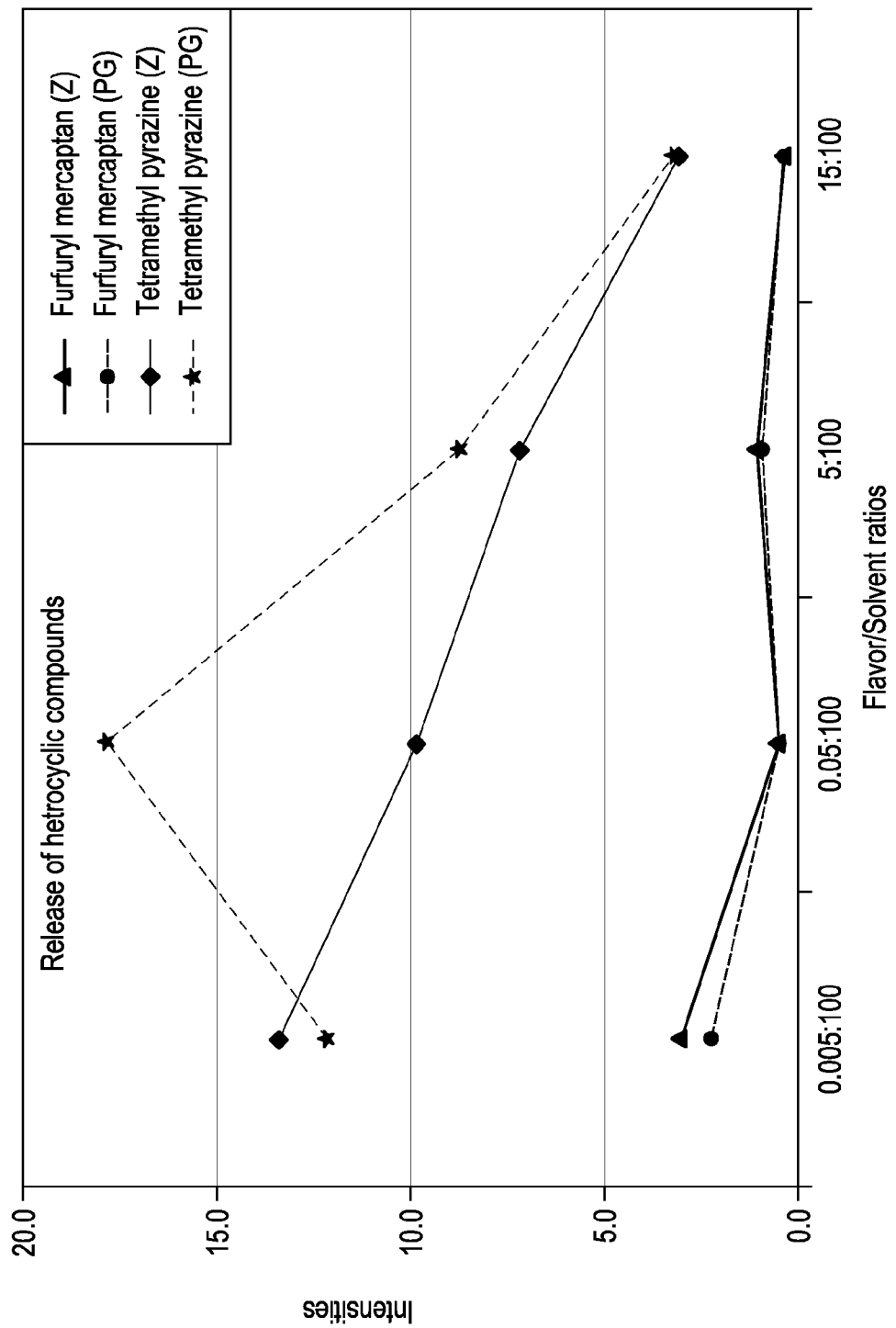
FIG. 2 is a chart showing the effect on release of heterocyclic compounds (furfural mercaptan and tetramethyl pyrazine) by 1,3-propanediol relative to propylene glycol at various ratios of flavor compound to 1,3-propanediol or propylene glycol.

When using a flavor/1,3-propanediol ratio of 0.05:100, 1,3-propanediol had a significant suppression effect on the release of tetramethyl pyrazine as shown in FIG. 2.

Figure 3:
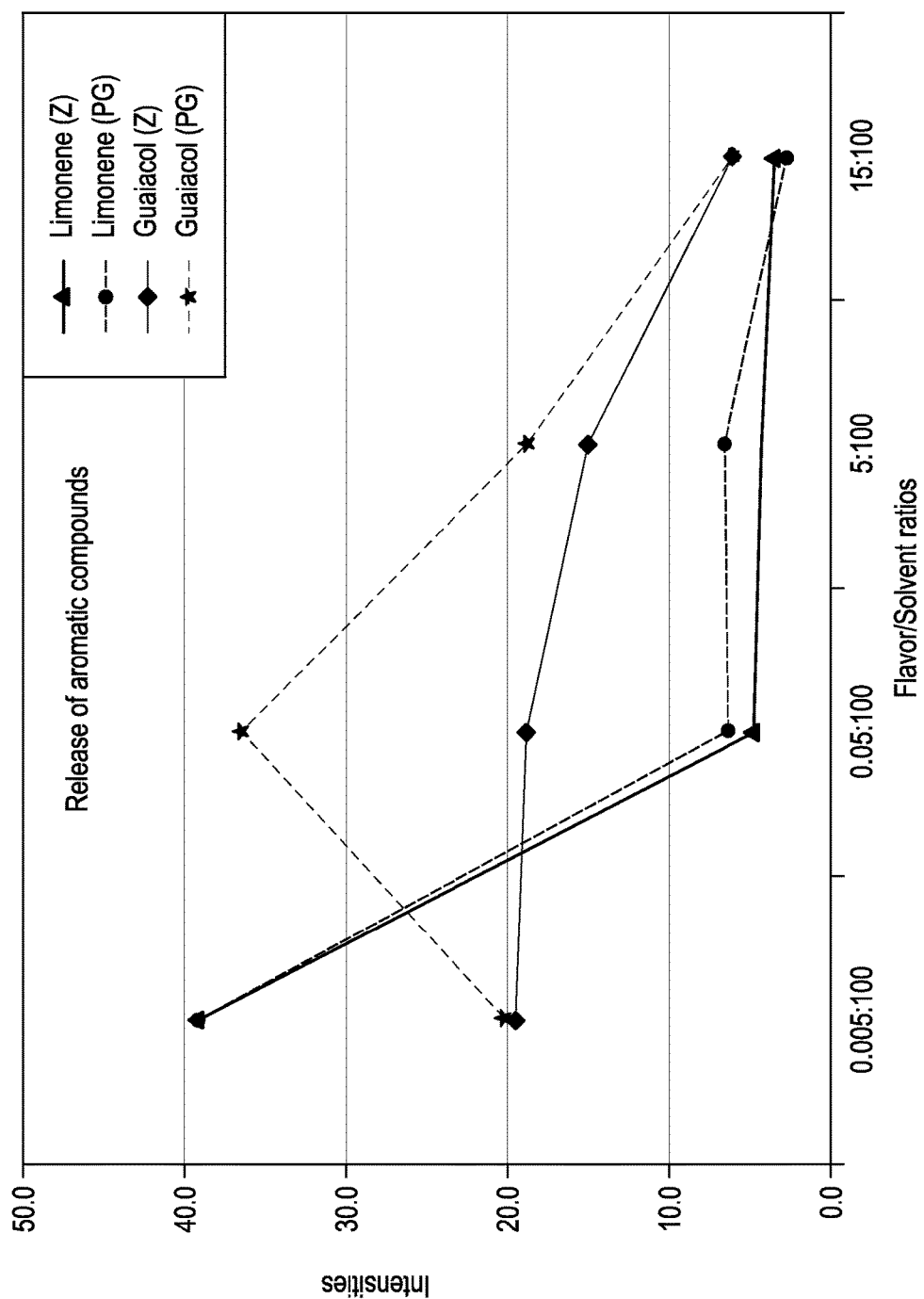
FIG. 3 is a chart showing the effect on the release of aromatic compounds (limonene and guaiacol) by 1,3-propanediol relative to propylene glycol at various ratios of flavor compound to 1,3-propanediol or propylene glycol.

At a flavor/1,3-propanediol ratio of 0.05:100, 1,3-propanediol had a significant suppression effect on the release of guaiacol as shown in FIG. 3.

Figure 4:
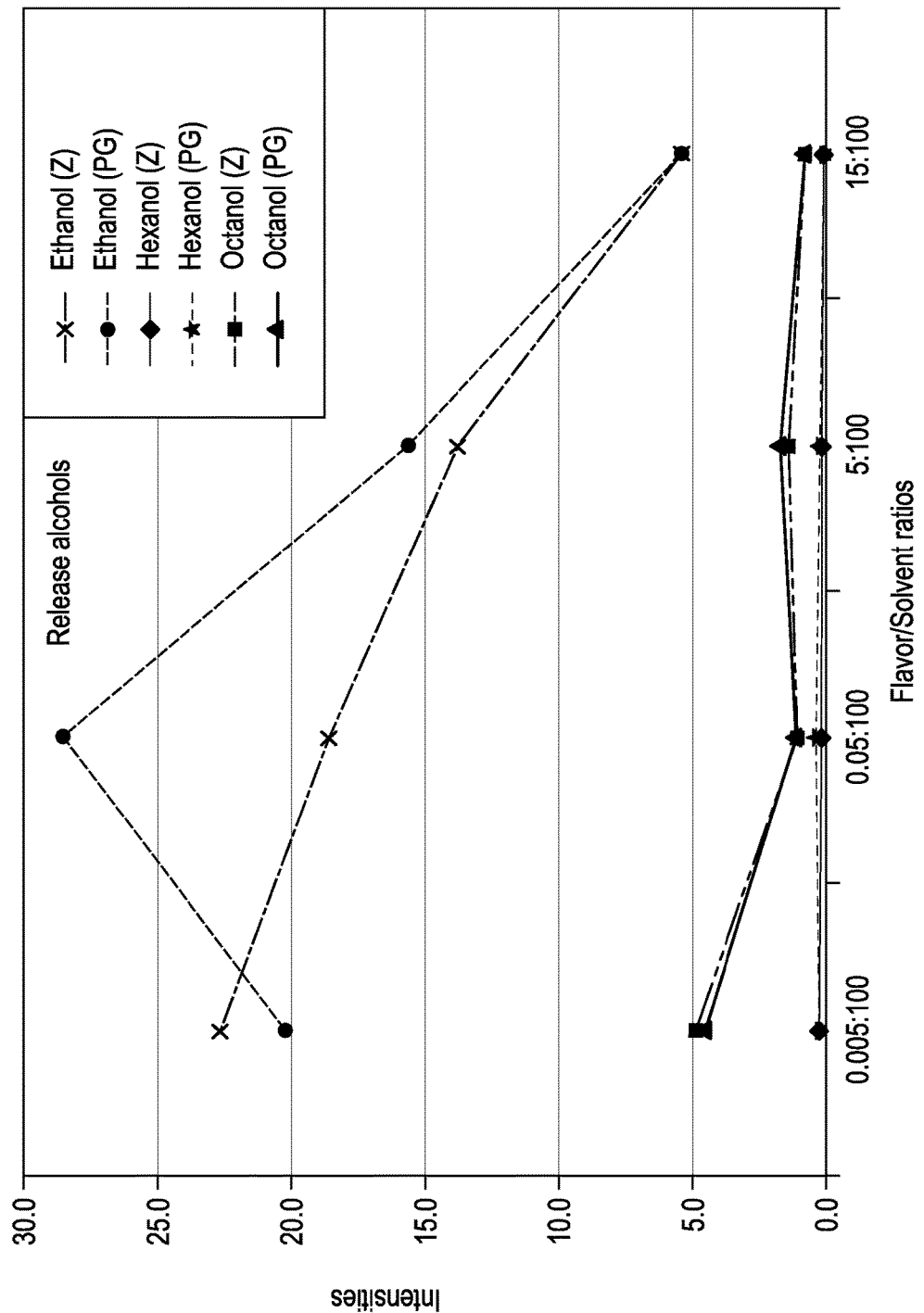
FIG. 4 is a chart showing the effect on the release of alcohols (ethanol, hexanol, and octanol) by 1,3-propanediol relative to propylene glycol at various ratios of flavor compound to 1,3-propanediol or propylene glycol.

When using a flavor/1,3-propanediol ratio of 0.05:100, 1,3-propanediol had a significant suppression effect on the release of ethanol as shown in FIG. 4. However, because it was later determined that ethanol is difficult to quantify in the H3O+ mode and is believed to be better quantified in the NO+ mode (not used in this experiment), the data was not believed to be reliable and is not included in the analysis.

Figure 5:
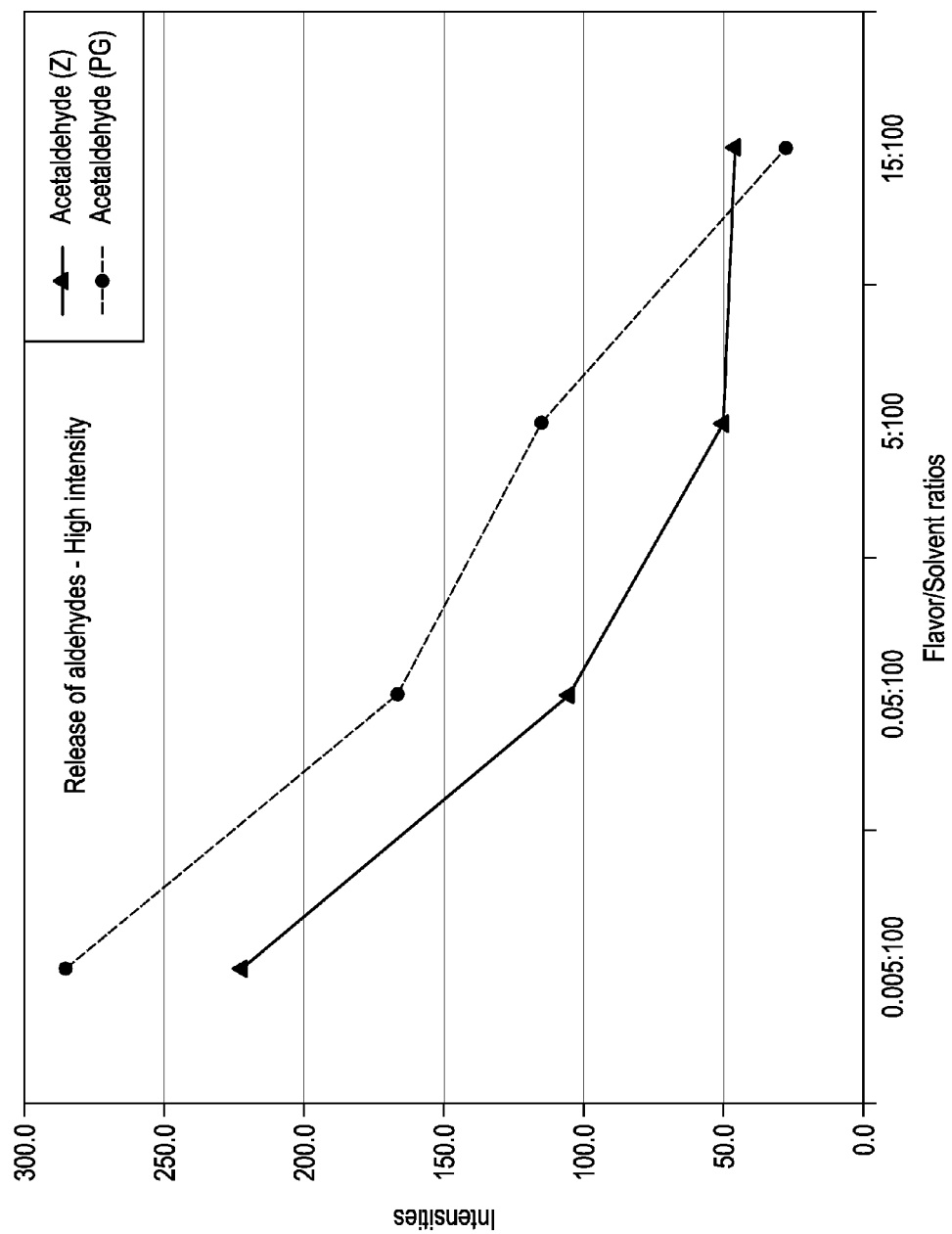
FIG. 5 is a chart showing the effect on the release of acetaldehyde by 1,3-propanediol relative to propylene glycol at various ratios of flavor compound to 1,3-propanediol or propylene glycol at various ratios of flavor compound to 1,3-propanediol or propylene glycol.

At a flavor/1,3-propanediol ratio of 0.005:100, 0.05:100, and 5:100, 1,3-propanediol had a significant suppression effect on the release of acetaldehyde as shown in FIG. 5.

Figure 6:
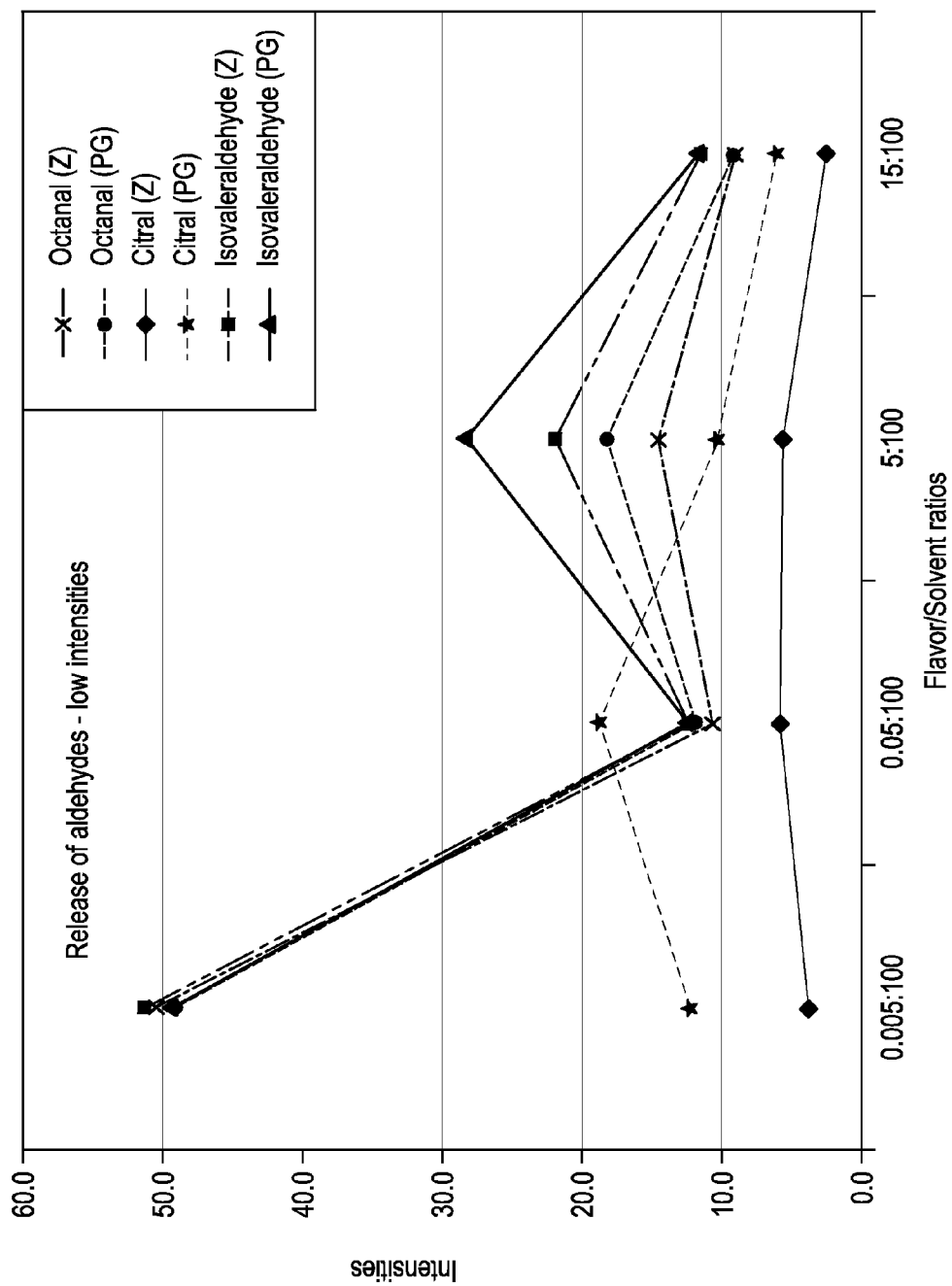
FIG. 6 is a chart showing the effect on the release of octanal, citral, and isovaleraldehyde by 1,3-propanediol relative to propylene glycol at various ratios of flavor compound to 1,3-propanediol or propylene glycol.

1,3-propanediol had a significant suppression effect on the release of citral, as shown in FIG. 6, when included at flavor to 1,3-propanediol ratio of about 0.005:100 to 15:100.

Figure 7:
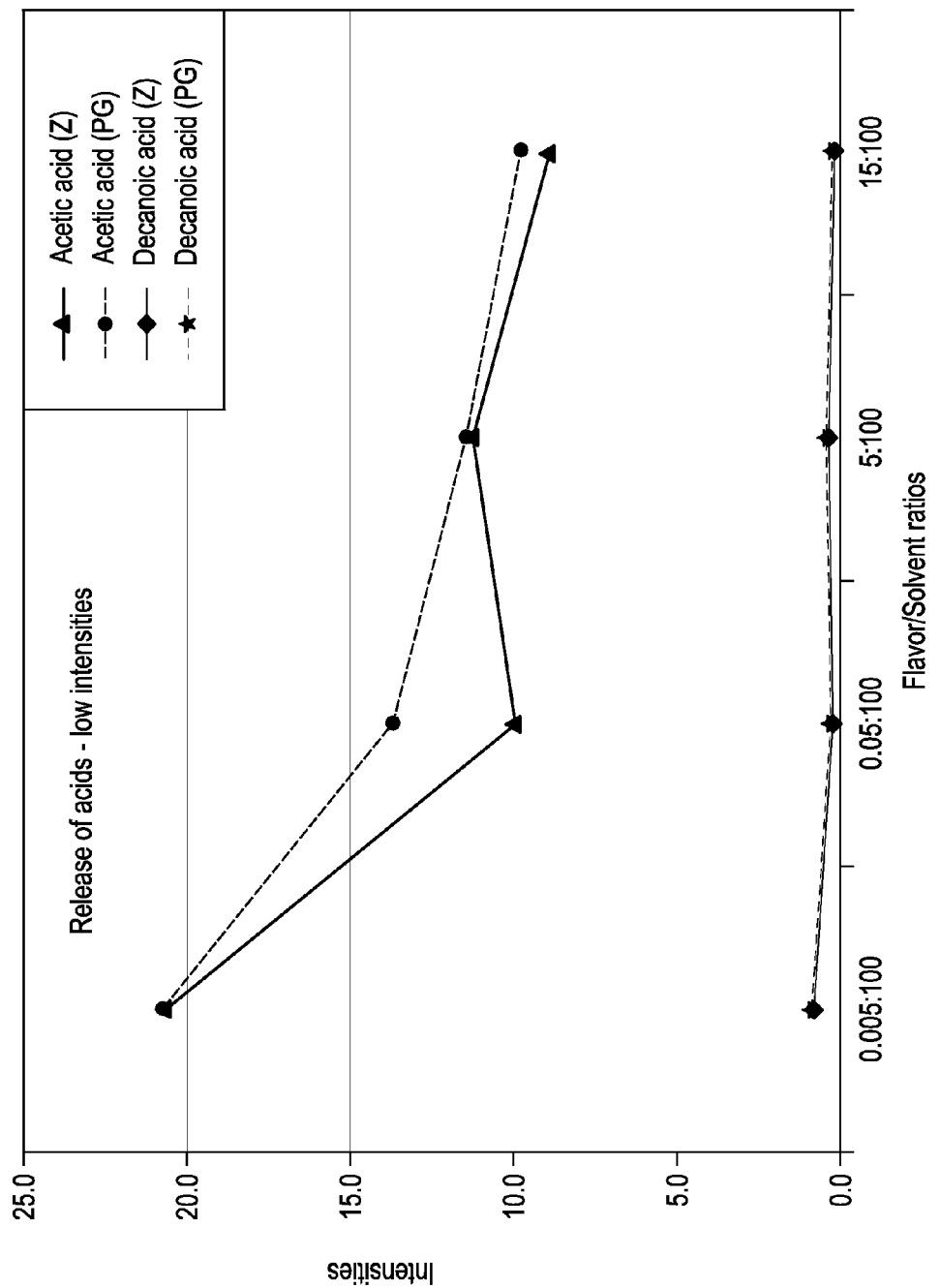
FIG. 7 is a chart showing the effect on the release of acetic acid and decanoic acid by 1,3-propanediol relative to propylene glycol at various ratios of flavor compound to 1,3-propanediol or propylene glycol.
Figure 8:
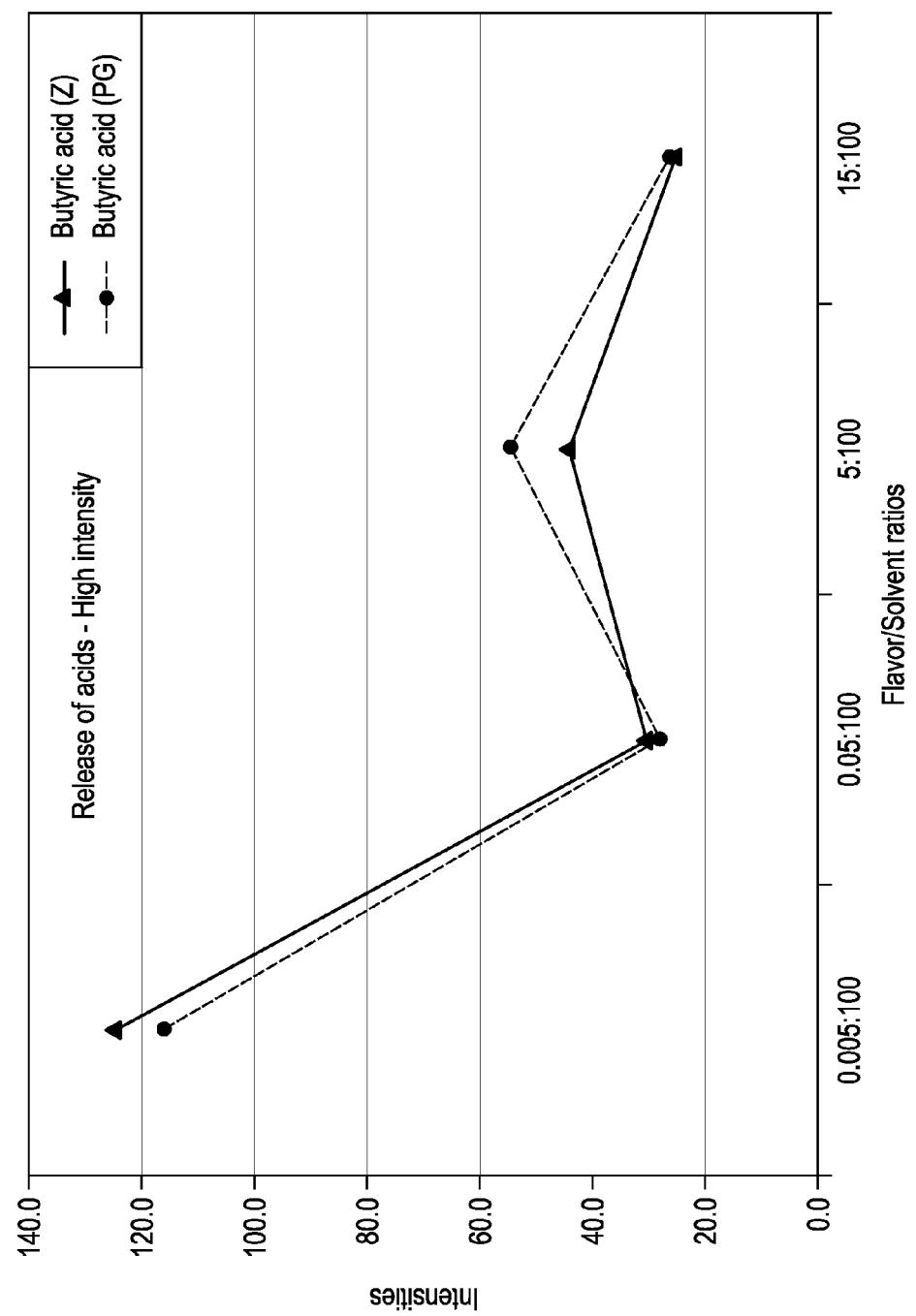
FIG. 8 is a chart showing the effect on the release of butyric acid by 1,3-propanediol relative to propylene glycol at various ratios of flavor compound to 1,3-propanediol or propylene glycol.

At a flavor/1,3-propanediol ratio of 0.05:100, 1,3-propanediol had a significant suppression effect on the release of acetic acid but had minimal effect on release of decanoic acid and butyric acid as shown in FIGS. 7 and 8.

Figure 9:
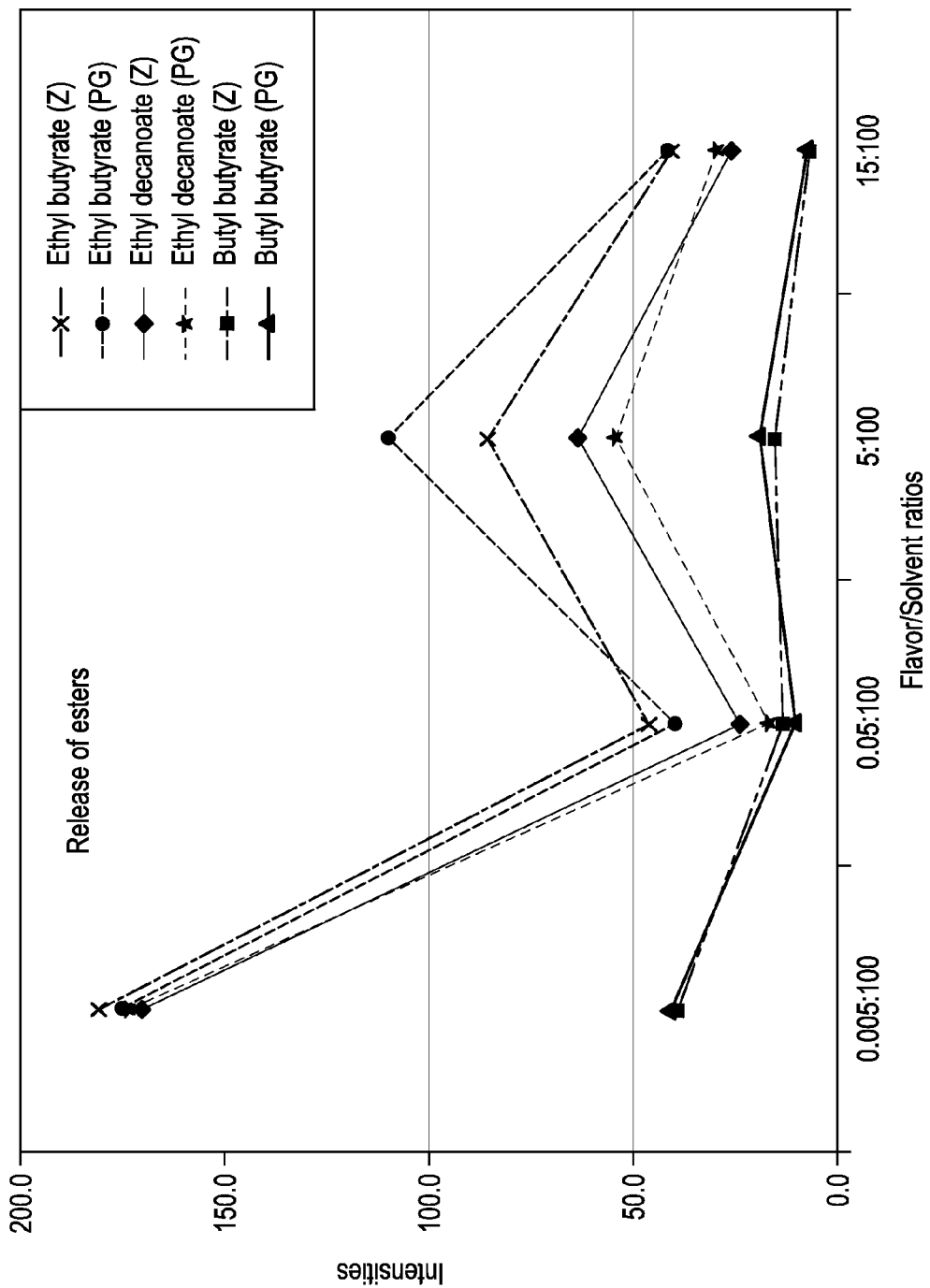
FIG. 9 is a chart showing the effect on the release of esters (ethyl butyrate, ethyl decanoate, and butyl butyrate) by 1,3-propanediol relative to propylene glycol at various ratios of flavor compound to 1,3-propanediol or propylene glycol.

The difference in release of esters (ethyl butyrate, ethyl decanoate, butyl butyrate) using 1,3-propanediol and propylene glycol is shown in FIG. 9.

Figure 10:
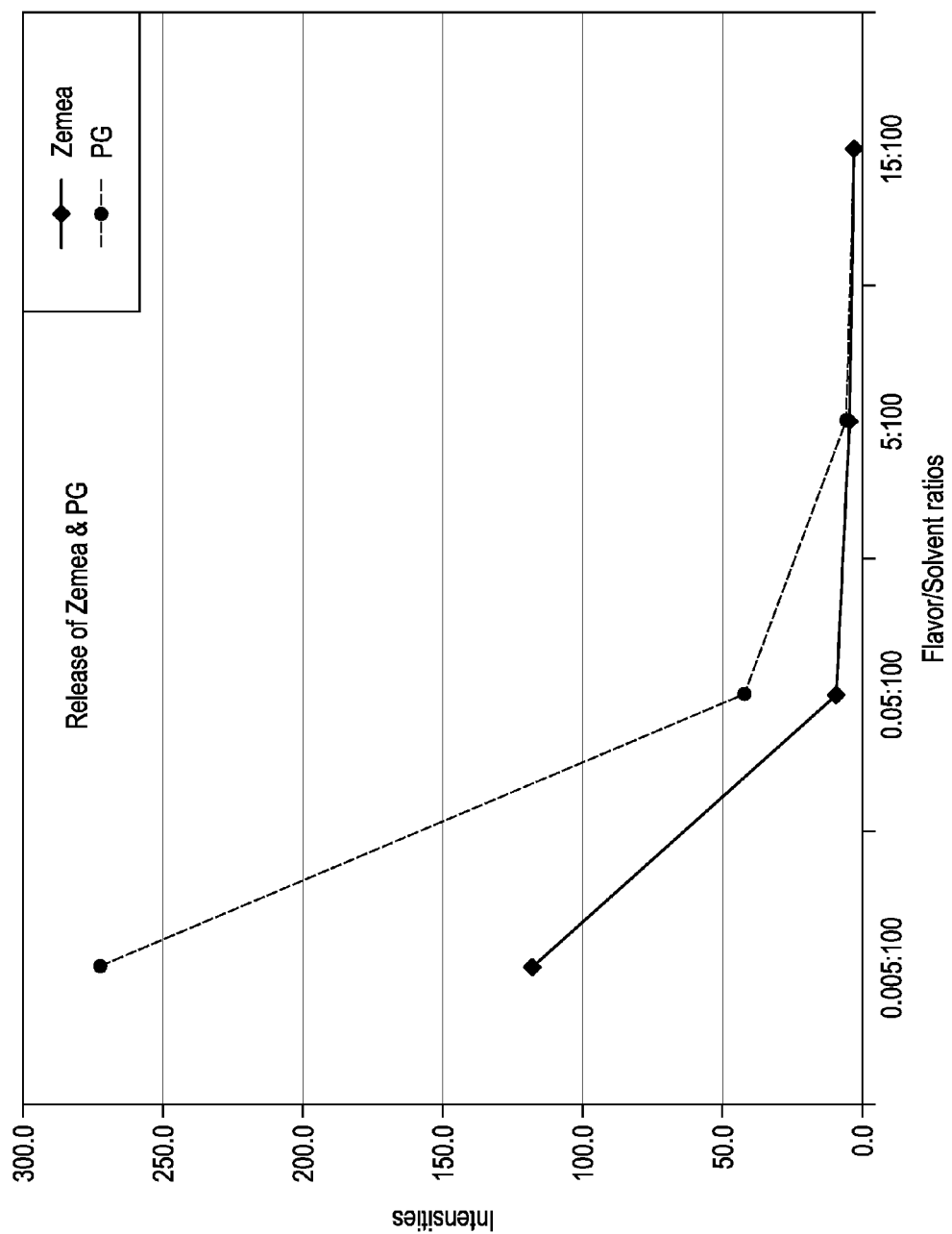
FIG. 10 is a chart showing the difference in release of 1,3-propanediol compared to propylene glycol at various ratios of 1,3-propanediol or propylene glycol to water.
Figures 11A, 11B:
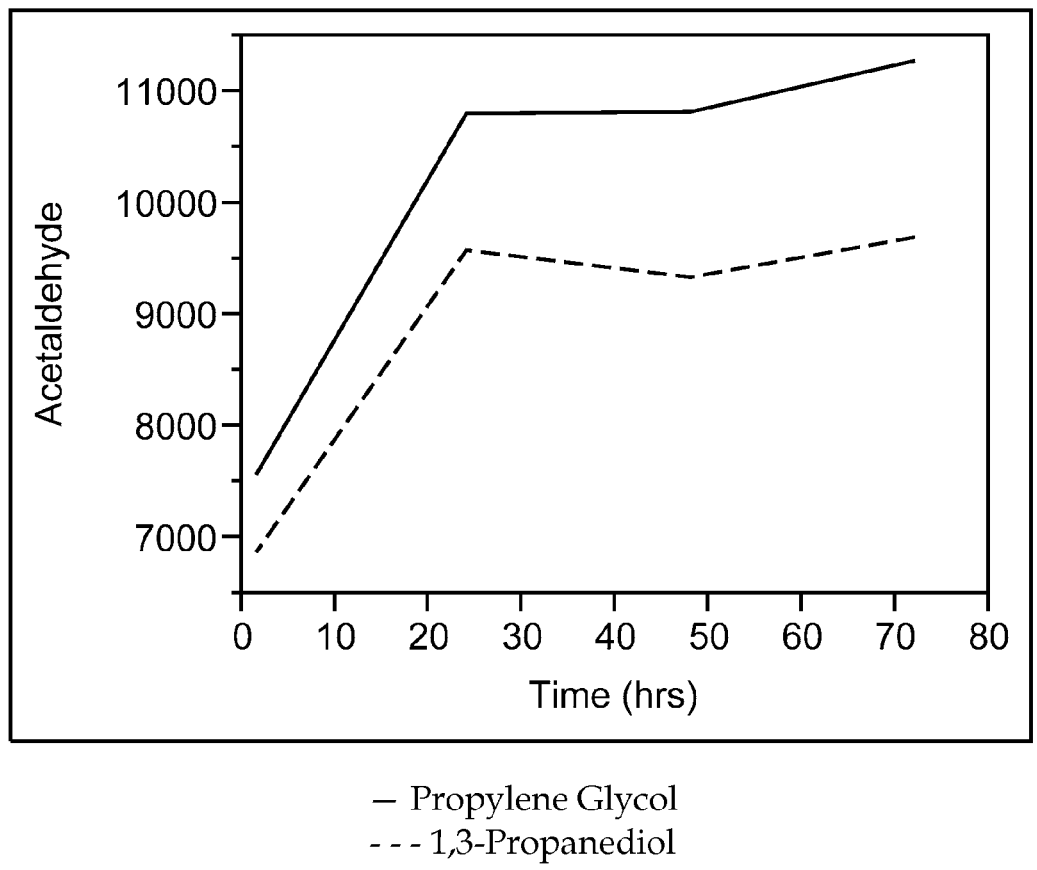
FIG. 11(A) is a chart showing the release of acetaldehyde over time when in the presence of 1,3-propanediol or propylene glycol
FIG. 11(B) is the corresponding statistical analysis.
Figures 12A, 12B:
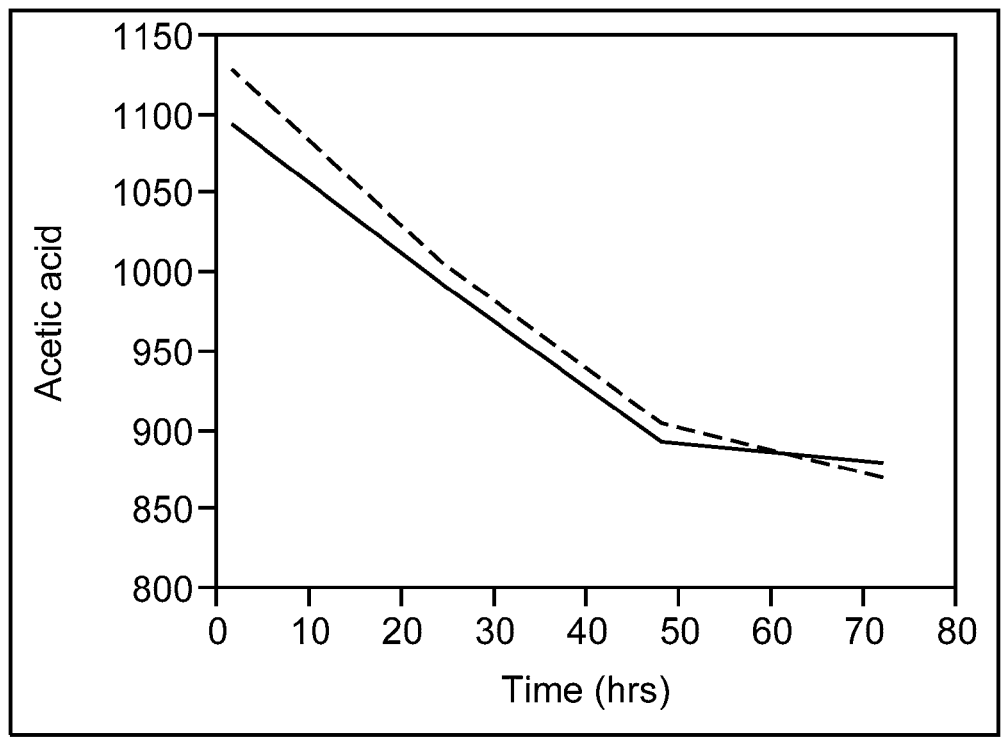
FIG. 12(A) is a chart showing the release of acetic acid over time when in the presence of 1,3-propanediol or propylene glycol
FIG. 12(B) is the corresponding statistical analysis.
Figures 13A, 13B:
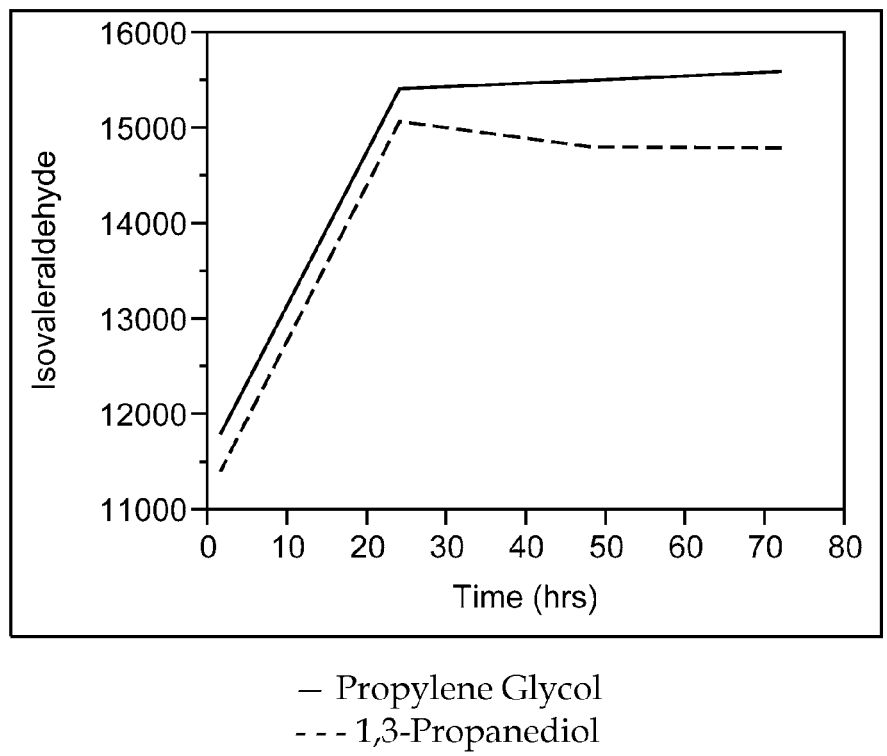
FIG. 13(A) is a chart showing the release of isovaleraldehyde over time when in the presence of 1,3-propanediol or propylene glycol
FIG. 13(B) is the corresponding statistical analysis.
Figures 14A, 14B:
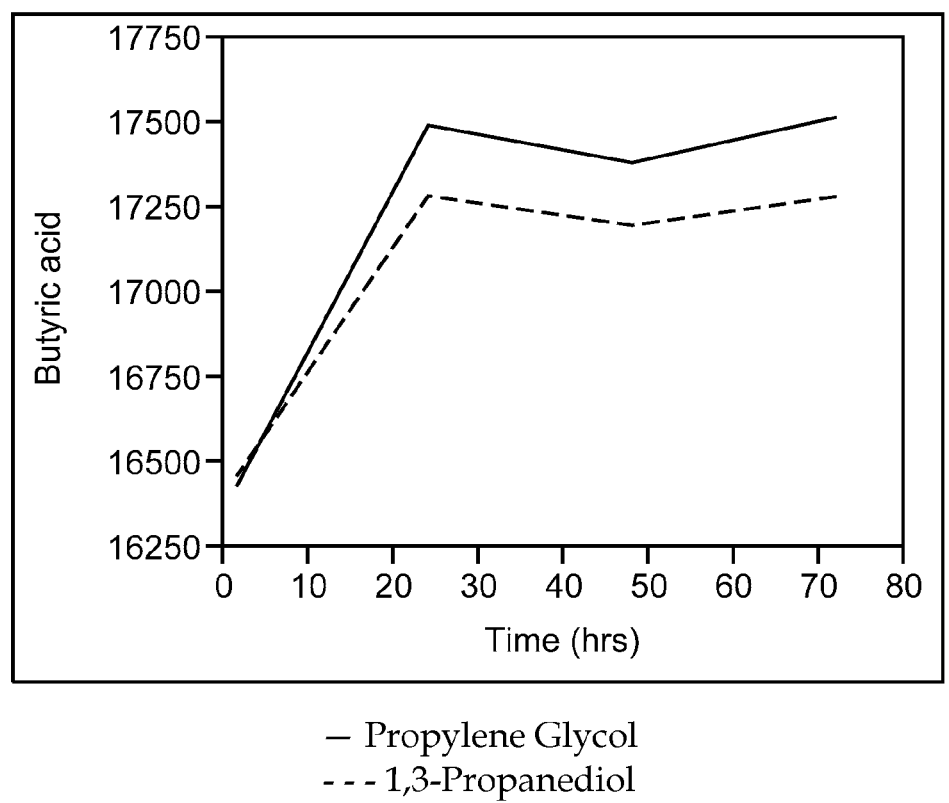
FIG. 14(A) is a chart showing the release of butyric acid over time when in the presence of 1,3-propanediol or propylene glycol
FIG. 14(B) is the corresponding statistical analysis.
Figures 15A, 15B:
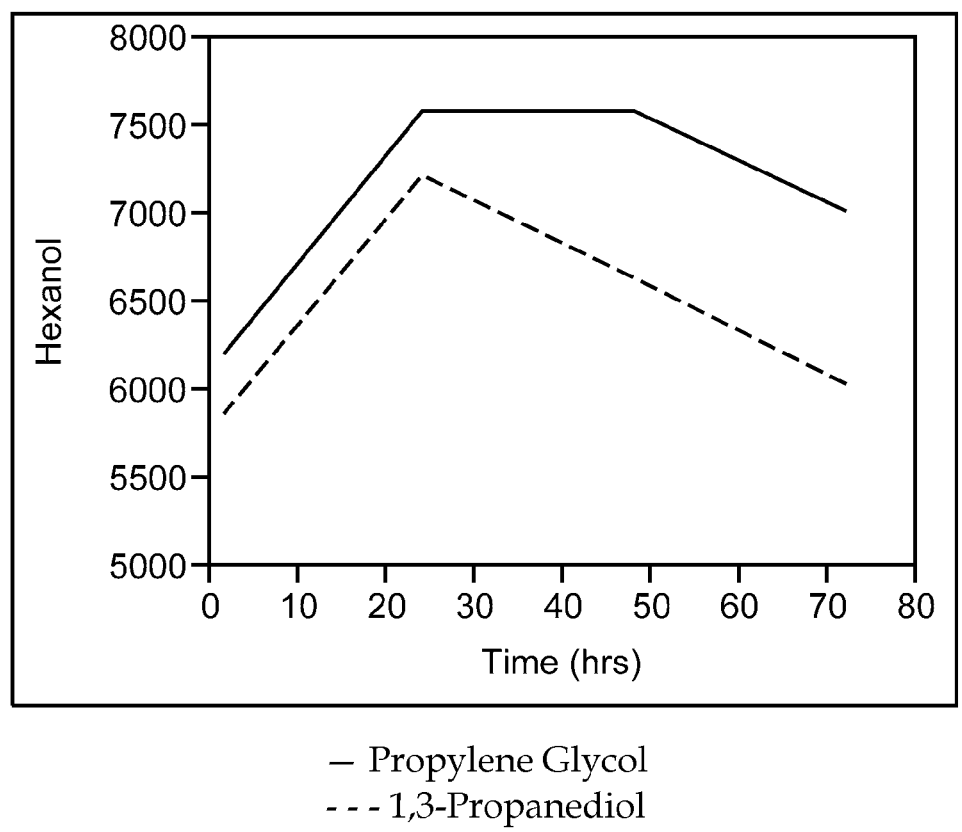
FIG. 15(A) is a chart showing the release of hexanol over time when in the presence of 1,3-propanediol or propylene glycol
FIG. 15(B) is the corresponding statistical analysis.
Figures 16A, 16B:
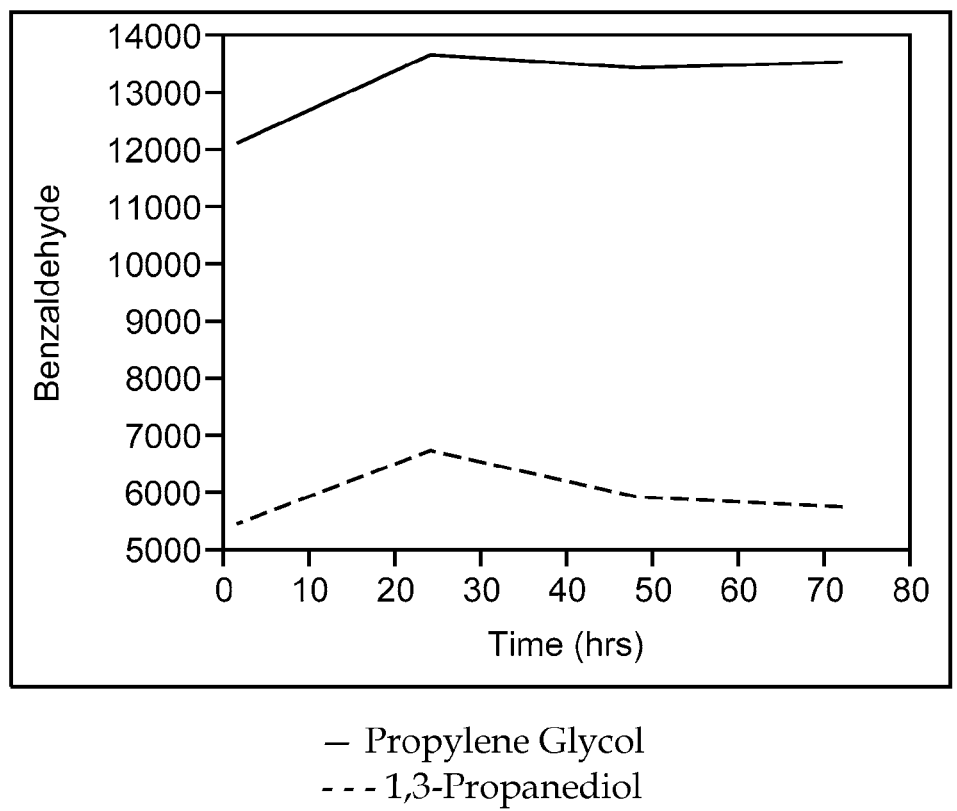
FIG. 16(A) is a chart showing the release of benzaldehyde over time when in the presence of 1,3-propanediol or propylene glycol
FIG. 16(B) is the corresponding statistical analysis.
Figures 17A, 17B:
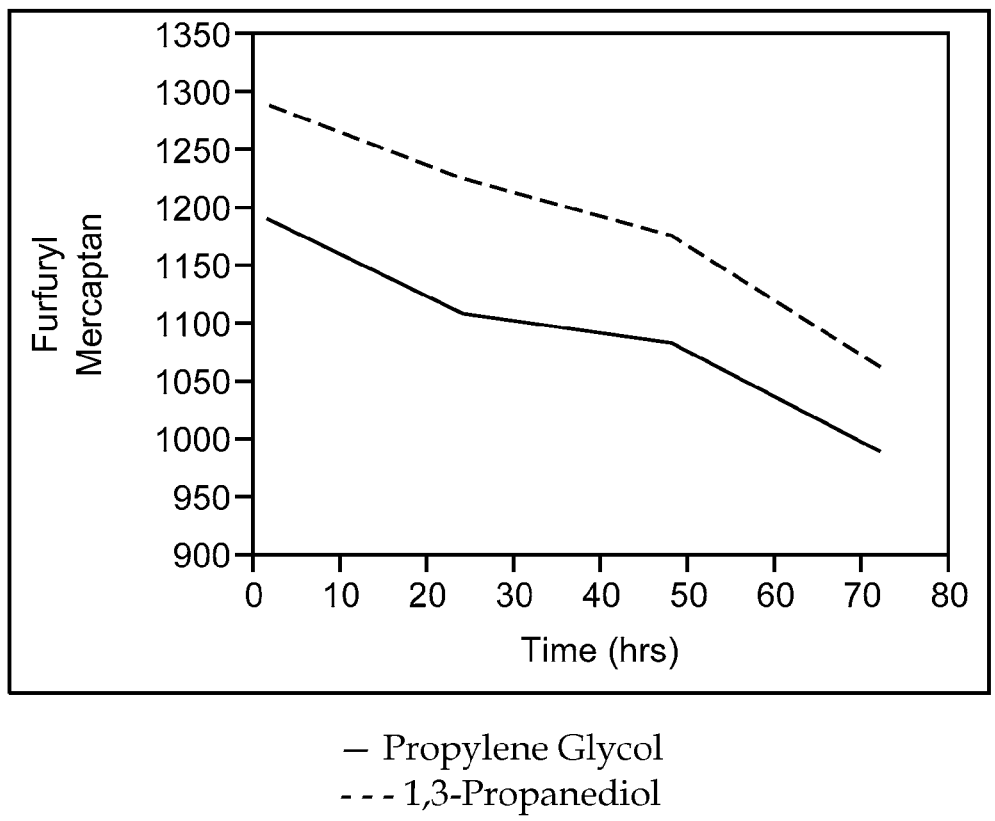
FIG. 17(A) is a chart showing the release of furfuryl mercapten over time when in the presence of 1,3-propanediol or propylene glycol
FIG. 17(B) is the corresponding statistical analysis.
Figures 18A, 18B:
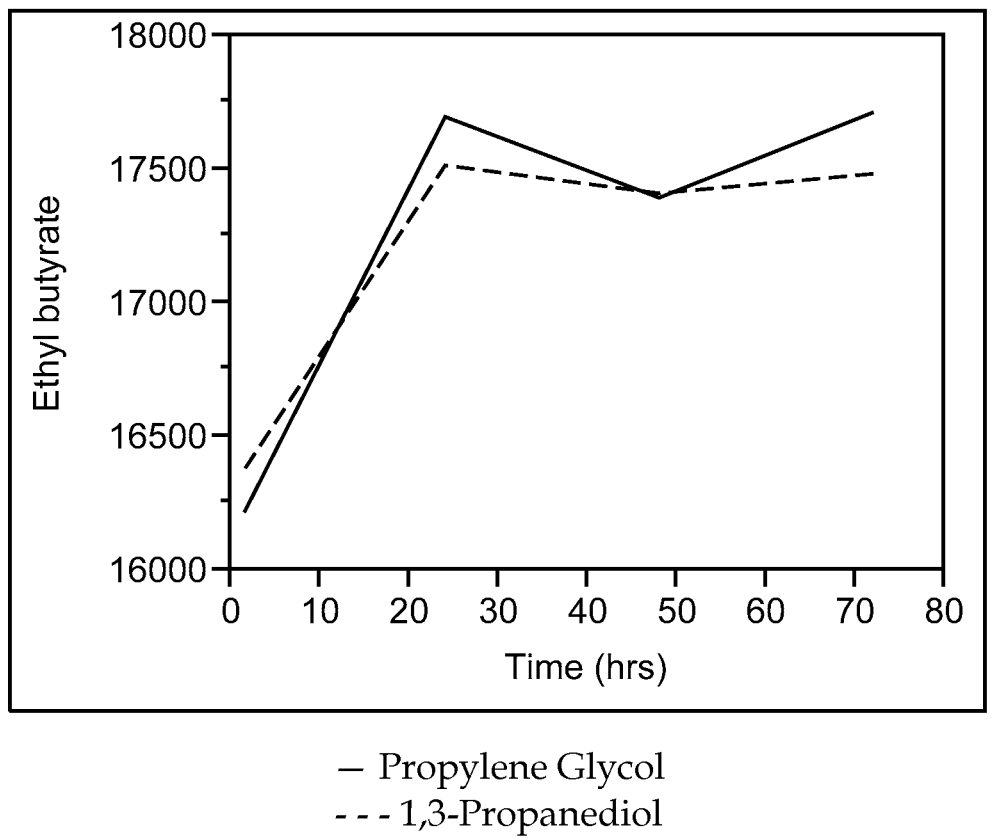
FIG. 18(A) is a chart showing the release of ethyl butyrate over time when in the presence of 1,3-propanediol or propylene glycol
FIG. 18(B) is the corresponding statistical analysis.
Figures 19A, 19B:
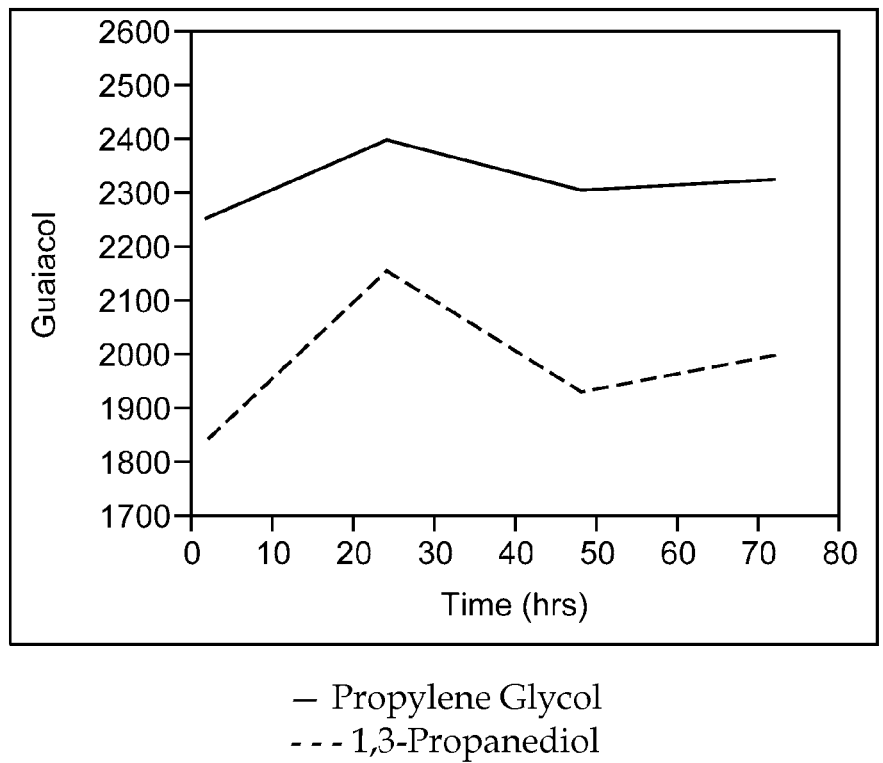
FIG. 19(A) is a chart showing the release of guaiacol over time when in the presence of 1,3-propanediol or propylene glycol
FIG. 19(B) is the corresponding statistical analysis.
Figures 20A, 20B:
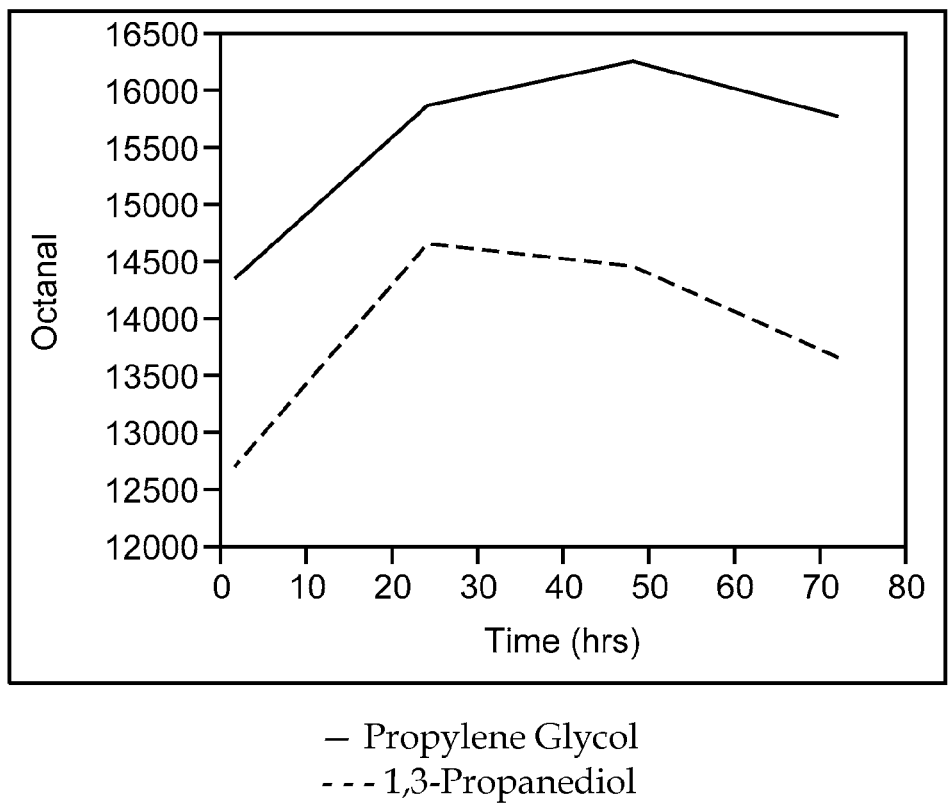
FIG. 20(A) is a chart showing the release of octanal over time when in the presence of 1,3-propanediol or propylene glycol
FIG. 20(B) is the corresponding statistical analysis.
Figures 21A, 21B:
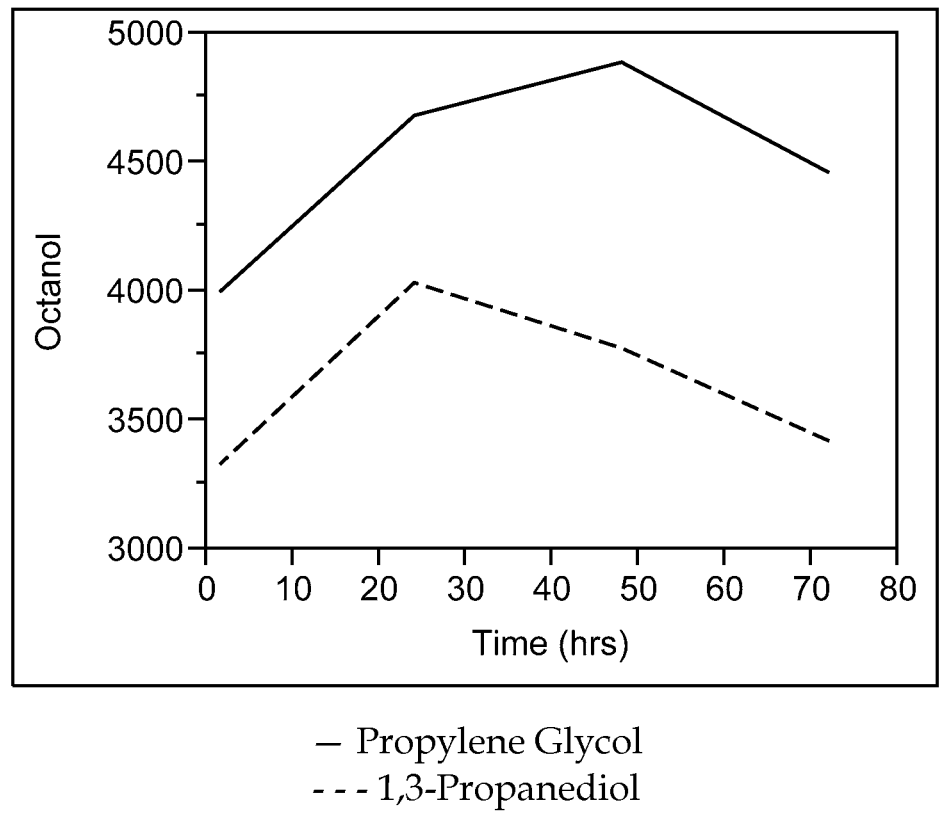
FIG. 21(A) is a chart showing the release of octanol over time when in the presence of 1,3-propanediol or propylene glycol
FIG. 21(B) is the corresponding statistical analysis.
Figures 22A, 22B:
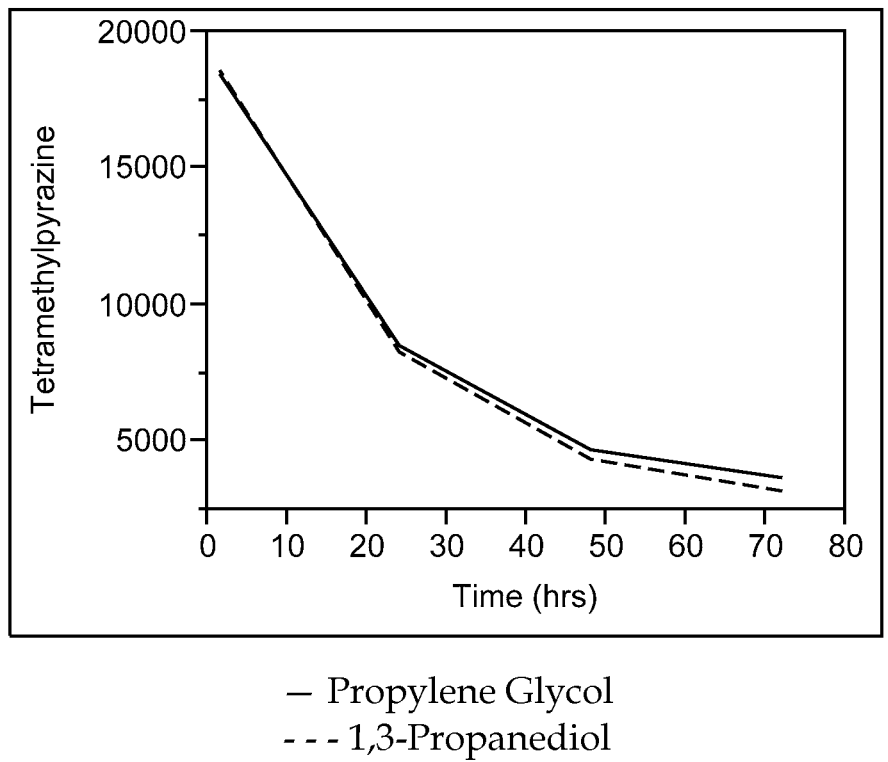
FIG. 22(A) is a chart showing the release of tetramethylpyrazine over time when in the presence of 1,3-propanediol or propylene glycol
FIG. 22(B) is the corresponding statistical analysis.
Figures 23A, 23B:
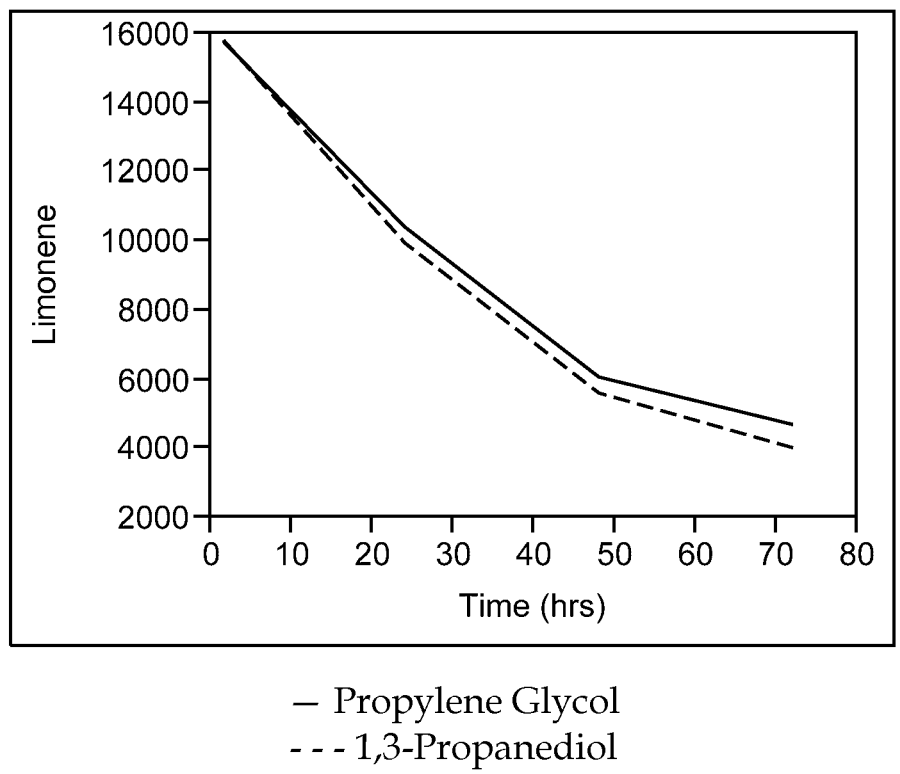
FIG. 23(A) is a chart showing the release of limonene over time when in the presence of 1,3-propanediol or propylene glycol
FIG. 23(B) is the corresponding statistical analysis.
Figures 24A, 24B:
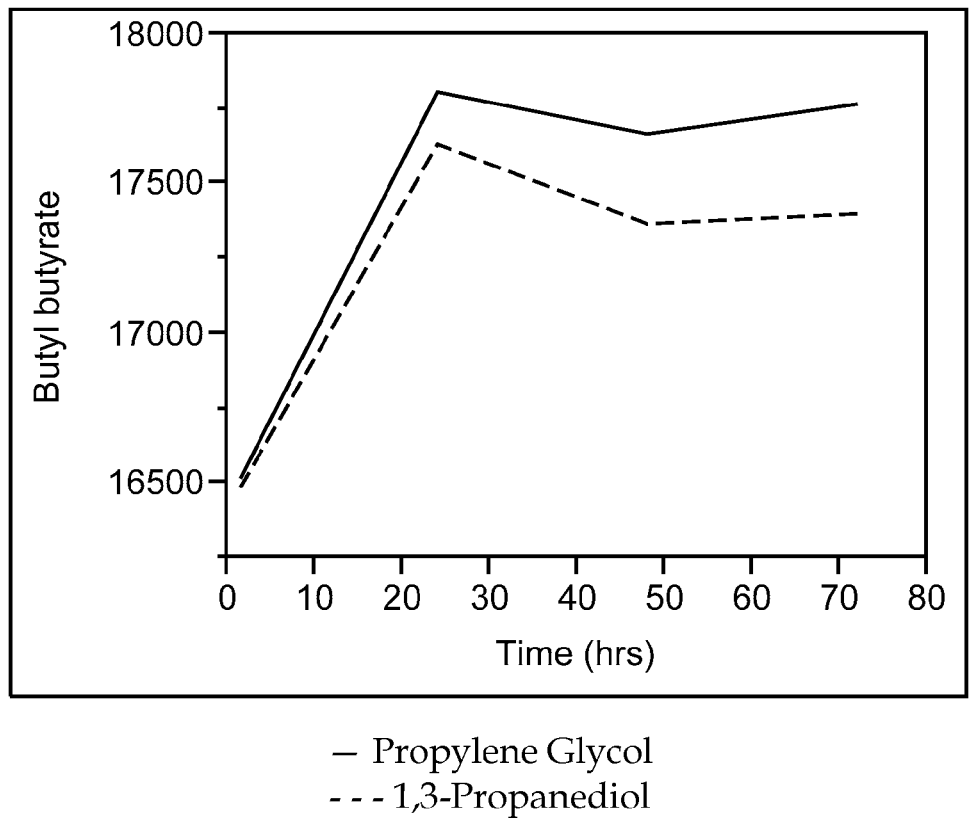
FIG. 24(A) is a chart showing the release of butyl butyrate over time when in the presence of 1,3-propanediol or propylene glycol
FIG. 24(B) is the corresponding statistical analysis.
Figures 25A, 25B:
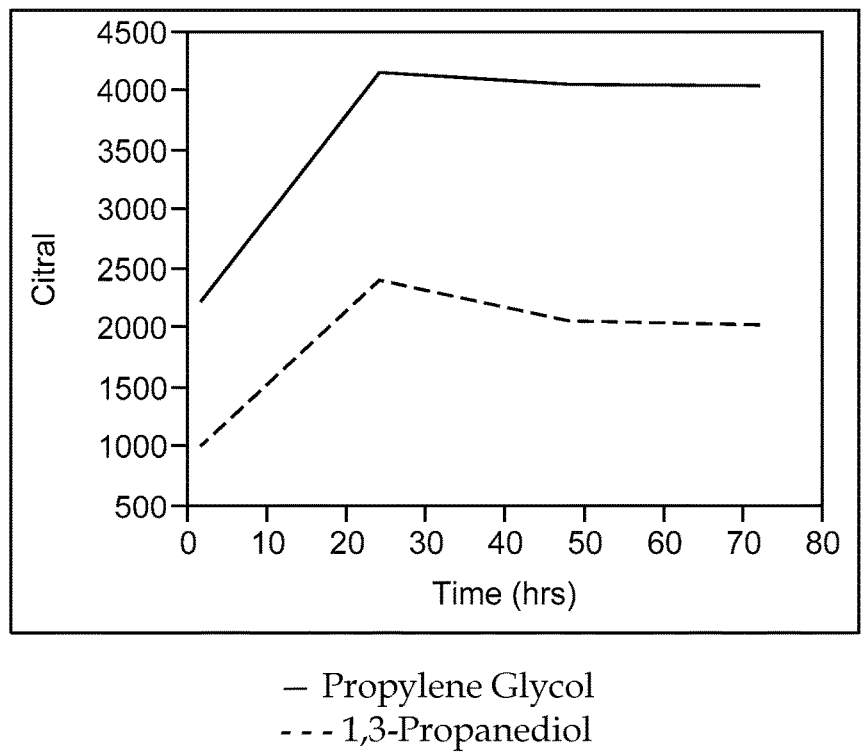
FIG. 25(A) is a chart showing the release of citral over time when in the presence of 1,3-propanediol or propylene glycol
FIG. 25(B) is the corresponding statistical analysis.
Figures 26A, 26B:
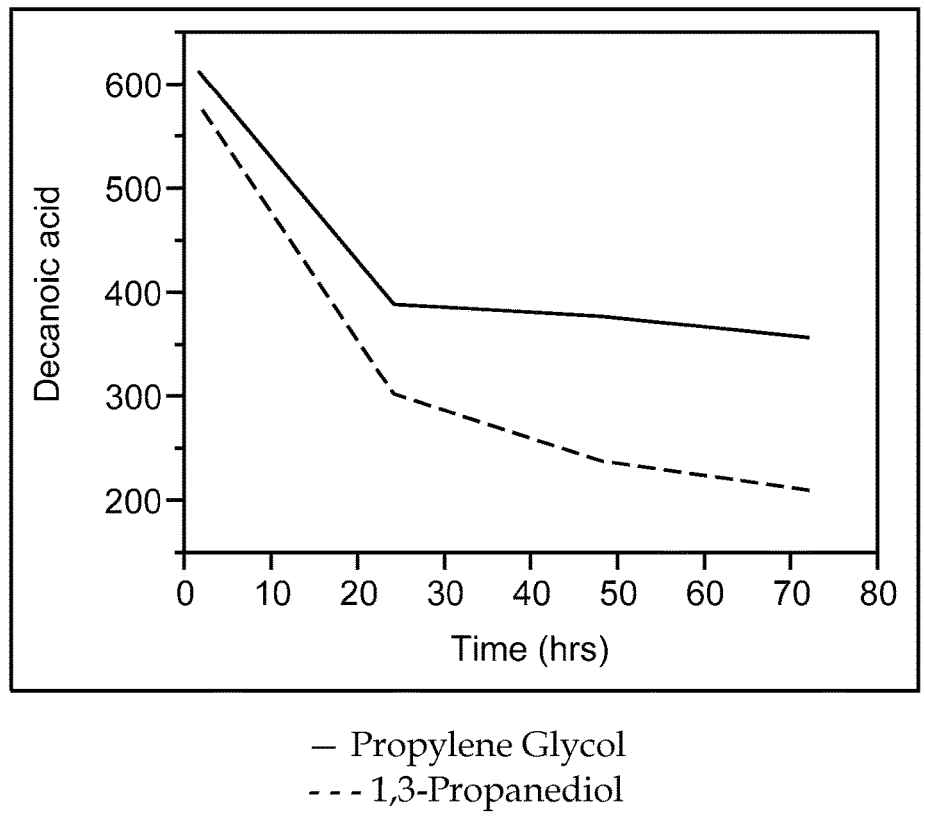
FIG. 26(A) is a chart showing the release of decanoic acid over time when in the presence of 1,3-propanediol or propylene glycol
FIG. 26(B) is the corresponding statistical analysis.
Figures 27A, 27B:
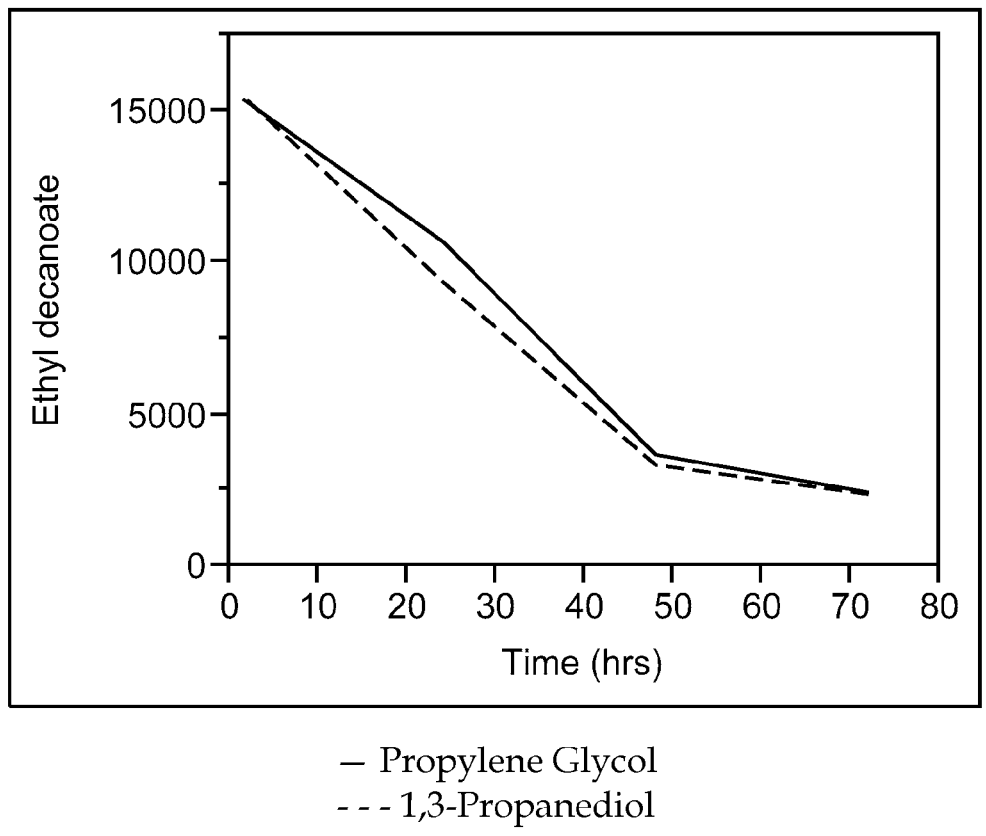
FIG. 27(A) is a chart showing the release of ethyl decanoate over time when in the presence of 1,3-propanediol or propylene glycol
FIG. 27(B) is the corresponding statistical analysis.

The release of 1,3-propanediol and propylene glycol was also evaluated at ratios of 0.005:100, 0.05:100, 5:100, and 15:100 (1,3-propanediol or propylene glycol to water) as shown in FIG. 10.

While not wishing to be limited by theory, it is presently believed that at low levels (below 0.05:100), there was not enough solvent to significantly affect flavor release. At the higher levels, there was an overwhelming amount of propylene glycol so even if propylene glycol was, for example, ⅔ as effective at binding flavor as 1,3-propanediol, there was enough propylene glycol in the system to effectively bind all flavor compounds, thereby overwhelming the system with propylene glycol.

The highest suppression by 1,3-propanediol was detected at ratios of 0.05:100 and 5:100 flavor/1,3-propanediol ratio and diminished at extreme high and low flavor/1,3-propanediol ratios (0.005:100 and 15:100), except for citral and acetaldehyde were still suppressed by 1,3-propanediol at 0.005:100.

Example 3

A flavoring was prepared by mixing the flavor compounds listed in Table 6 below. The flavoring was then diluted in water for analysis. The final concentration of each compound was held constant at 8 ppm except furfuryl mercaptan was included at 1.6 ppm to maintain a constant flavor level in the resulting beverage while the non-aqueous liquid varied but the ratio of each compound to non-aqueous liquid was held constant at 0.05:100. A variety of non-aqueous liquids were evaluated, including 1,4-butanediol; 1,7-heptandiol; 1,3-butandiol, propylene glycol, and 1,3-propanediol.

TABLE 6

| Compound | |
|---|---|
| Acetic acid | 0.05 |
| Butyric acid | 0.05 |
| Decanoic acid | 0.05 |
| Acetaldehyde | 0.05 |
| Octanal | 0.05 |
| Citral (3,7-dimethyl-2,6-octadienal | 0.05 |
| Isovaleraldehyde | 0.05 |
| Ethyl butyrate | 0.05 |
| Ethyl caprate | 0.05 |
| Butyl butyrate | 0.05 |
| Ethanol | 0.05 |
| Octanol | 0.05 |
| Hexanol | 0.05 |
| Benzaldehyde | 0.05 |
| Guaiacol | 0.05 |
| Furfuryl mercaptan | 0.01 |
| Tetramethyl pyrazine | 0.05 |
| Limonene | 0.05 |
| Non-aqueous liquid | 100.0 |

It was found that the position of the alcohol groups within the compound was important to suppressing flavor release. Samples were analyzed by PTR-MS as described in Example 1. The results are presented in Table 7 below.

TABLE 7

| | Propylene glycol | 1,3-propanediol | Percent suppression by 1,3-propanediol relative to PG | 1,4-butanediol | 1,3-butanediol | Percent suppression by 1,3-butanediol relative to 1,4-butanediol | 1,7-heptanediol |
|---|---|---|---|---|---|---|---|
| Acids | | | | | | | |
| Acetic acid | 13.70 | 9.90 | −27.7 | 15.6 | 16.9 | 8.0 | 13.4 |
| Butyric acid | 28.00 | 30.25 | 8.0 | 143.8 | 91.7 | −56.8 | 140.0 |
| Decanoic acid | 0.25 | 0.20 | −20.0 | 1.4 | 0.6 | −147.8 | 1.0 |
| Aldehydes | | | | | | | |
| Acetaldehyde | 165.85 | 104.00 | −37.3 | 196.5 | 157.0 | −25.2 | 206.5 |
| Octanal | 11.95 | 10.70 | −10.5 | 56.0 | 42.9 | −30.5 | 67.0 |
| Citral | 18.80 | 5.83 | −69.0 | 13.5 | 6.0 | −124.2 | 24.3 |
| Isovaleraldehyde | 12.51 | 12.35 | −1.3 | 62.5 | 40.9 | −53.0 | 63.5 |
| Esters | | | | | | | |
| Ethyl butyrate | 40.20 | 46.20 | 14.9 | 239.3 | 141.5 | −69.10 | 223.5 |
| Ethyl decanoate | 16.84 | 23.9 | 41.9 | 258.0 | 117.0 | −120.5 | 131.3 |
| Butyl butyrate | 10.50 | 13.57 | 29.2 | 49.4 | 27.9 | −77.2 | 46.4 |
| Alcohols | | | | | | | |
| Ethanol | 28.52 | 18.60 | −34.8 | 27.5 | 20.7 | −32.6 | 24.5 |
| Hexanol | 0.37 | 0.20 | −45.9 | 0.5 | 0.3 | −50.0 | 0.3 |
| Octanol | 1.19 | 1.05 | −11.4 | 5.1 | 4.0 | −27.5 | 6.2 |

TABLE 7-continued

| | Propylene glycol | 1,3-propanediol | Percent suppression by 1,3-propanediol relative to PG | 1,4-butanediol | 1,3-butanediol | Percent suppression by 1,3-butanediol relative to 1,4-butanediol | 1,7-heptanediol |
|---|---|---|---|---|---|---|---|
| Cyclic compounds | | | | | | | |
| Benzaldehyde | 136.25 | 13.20 | −90.3 | 354.0 | 250.0 | −41.6 | 357.5 |
| Limonene | 6.55 | 4.9 | −25.2 | 59.7 | 13.5 | −343.5 | 59.5 |
| Guaiacol | 36.50 | 18.95 | −48.1 | 39.9 | 28.4 | −40.3 | 36.2 |
| Furfuryl mercaptan | 0.51 | 0.55 | 7.8 | 0.3 | 1.3 | 73.9 | 2.1 |
| Tetramethyl pyrazine | 17.85 | 9.89 | −44.6 | 20.5 | 12.3 | −67.3 | 22.0 |

Percent suppression was calculated by the following formula: $(I_{1\text{-}3\text{-}diol} - I_{alternate\ diol})/I_{alternate\ diol} \times 100$.

As can be seen above in Table 7, it was found that compounds having alcohol groups in the 1,3 position generally enhanced flavor suppression relative to the comparative compound having alcohol groups in the 1,2 position. While only diols were analyzed herein, it is presently believed that compounds having two or more total alcohol groups would behave similarly so long as at least two alcohol groups are in a 1,3 position.

It was further found that using 1,7-heptandiol as the non-aqueous liquid resulted in faster release than propylene glycol. As such, 1,7-heptanediol could be used in applications where increased flavor release is desirable.

Example 4

A model flavoring was prepared. The flavoring included the compounds below in Table 8.

TABLE 8

| Compound | Amount in Flavoring |
|---|---|
| Acetic acid | 5.85% |
| Butyric acid | 5.85% |
| Decanoic acid | 5.85% |
| Acetaldehyde | 5.85% |
| Octanal | 5.85% |
| Citral (3,7-dimethyl-2,6-octadienal | 5.85% |
| Isovaleraldehyde | 5.85% |
| Ethyl butyrate | 5.85% |
| Ethyl caprate | 5.85% |
| Butyl butyrate | 5.85% |
| Ethanol | 5.85% |
| Octanol | 5.85% |
| Hexanol | 5.85% |
| Benzaldehyde | 5.85% |
| Guaiacol | 5.85% |
| Furfuryl mercaptan | 0.55% |
| Tetramethyl pyrazine | 5.85% |
| Limonene | 5.85% |

0.86 grams of the flavor concentrate was then added to 100 grams of either propylene glycol or 1,3-propanediol to provide diluted concentrates. Two beverages were then prepared by combining 98.40 percent filtered water with either 1.60 percent propylene glycol diluted flavor or concentrate or 1,3-propanediol diluted flavor concentrate.

The beverages were then stored in sealed containers in a refrigerator. The container was opened five times over the course of the experiment and therefore represented a beverage in a sealed container being opened for multiple uses. 15 gram samples were weighed into a 4 ounce cup and analyzed at 1.5 hours, 24 hours, 48 hours, and 72 hours after storage.

The samples were analyzed in triplicate by PTR-MS as described below to determine impact of 1,3-propanediol or propylene glycol on release of the flavors from the beverage. The PTR-MS was performed as follows. A sampling apparatus was needed in conjunction with the PTR-MS inlet to prevent variations caused by headspace kinetics. The sampling apparatus used includes a 4 ounce sample vessel equipped with a 2-hole lid which may be sealed by an adhesive film to allow equilibration. One hole was designated for sampling and the second hole was designated for entry of a dilution gas (e.g., ambient air uncontaminated by volatiles of interest). The holes were equal sized (~2 mm diameter) and match the outer diameter of the PTR-MS inlet line. The flow of the dilution gas into the vessel was regulated by the vacuum and proportional valve of the PTR-MS inlet system. The sample vessel had a base diameter of 47 mm and is 45 mm high, of which 8 mm of height is occupied by the sample in the vessel in these experiments. The 2 holes in the lid were equidistant from the edge of the vessel (~20 mm) and ~30 mm from each other. The PTR-MS inlet was braced by clamps in a fixed position vertically above the laboratory bench (~55 mm) and a silicone rubber depth gauge was affixed to the PTR-MS inlet tubing and set at 18 mm. The PTR-MS inlet was consistently oriented in a vertical position 18 vmm below the inside lid of the vessel and 19 mm above the sample in the vessel. The sample vessel was then held in place during sampling according to the depth gauge on the inlet line and the vessel was subsequently supported on the bench by a 10 mm plastic spacer.

15 grams of the sample to be tested (e.g., food or beverage product containing 1,3-propanediol) are added to the vessel and the vessel is sealed and allowed to equilibrate at room temperature (~22° C.) for 90 minutes. At the time of sampling, the seal was removed from both the sampling hole and the dilution gas hole in the lid and the vessel was immediately affixed to the PTR-MS inlet via the sampling hole. The real-time released flavor was measured from the headspace of the sample vessel for two minutes (according to the conditions listed in Table 1 above).

The data was analyzed using PTR-MS Viewer, Version 3.0.0.101 (Ionicon Analytik G.m.b.H). The point of maximum intensity for each compound of interest was determined and recorded according to the PTR-MS Viewer software. The maximum intensity in counts over the timescale for each compound of interest was used for data analysis as it reflected the static equilibrium headspace concentration in the system at the moment of seal removal.

Due to the necessity of a dilution gas, the volatile concentration decreased over time as the compounds of interest re-equilibrated to a state of dynamic equilibrium in the headspace.

At the time of sampling, the seal was removed from both the sampling hole and the dilution gas hole in the lid and the vessel was immediately affixed to the PTR-MS inlet via the sampling hole. The real-time released flavor was measured from the headspace of the sample vessel for two minutes (according to the conditions listed in Table 1 above).

The data was analyzed using PTR-MS Viewer, Version 3.0.0.101 (Ionicon Analytik G.m.b.H). The point of maximum intensity for each compound of interest was determined and recorded according to the PTR-MS Viewer software. The maximum intensity in counts over the timescale for each compound of interest was used for data analysis as it reflected the static equilibrium headspace concentration in the system at the moment of seal removal. Due to the necessity of a dilution gas, the volatile concentration only decreased over time as the compounds of interest re-equilibrated to a state of dynamic equilibrium in the headspace.

The results are presented in FIGS. 11(A)-27(A) and the statistical analyses are presented in FIGS. 11(B)-27(B). The statistical differences were determined by Tukey-Kramer Honest Standard Deviation. The dashed lines in FIGS. 11(A)-27(A) represent 1,3-propanediol and the straight line represents propylene glycol. 1,3-propanediol had little effect on flavor release relative to propylene glycol for acetic acid, ethyl butyrate, tetramethylpyrazine, limonene, and ethyl decanoate. 1,3-propanediol significantly suppressed release of hexanol, benzaldehyde, guaiacol, octanal, octanol, and citral relative to propylene glycol. Only with furfuryl mercaptan did 1,3-propanediol significantly increase the rate of release of a compound. The data demonstrated that 1,3-propanediol interacts with certain classes of compounds to suppress flavor release.

Example 5

A further experiment was conducted to determine if the change in flavor release can be explained by the change in vapor pressure of the compounds in various solvents, two model flavor systems were prepared according to Table 9 below, one in 1,3-propanediol and the other in propylene glycol. Then the head space was analyzed as described above.

TABLE 9

| Compound | Concentration (%) |
| --- | --- |
| Acetic Acid | 5.85 |
| Butyric Acid | 5.85 |
| Decanoic Acid | 5.85 |
| Acetaldehyde | 5.85 |
| Octanal | 5.85 |
| Citral | 5.85 |
| Isovaleraldehyde | 5.85 |
| Ethyl Butyrate | 5.85 |
| Ethyl Caprate | 5.85 |
| Butyl Butyrate | 5.85 |
| Ethanol | 5.85 |
| Octanol | 5.85 |
| Hexanol | 5.85 |
| Benzaldehyde | 5.85 |
| Guaiacol | 5.85 |
| Furfuryl Mercaptan | 0.55 |
| Tetramethyl Pyrazine | 5.85 |
| Limonene | 5.85 |

0.86 grams of the concentrate was added to 100 grams of either propylene glycol or 1,3-propanediol to provide a 1,3-propanediol diluted concentrate or propylene glycol diluted concentrate. The diluted concentrates were then further diluted as outlined in Table 10 below.

TABLE 10

|  | Sample 1 | Sample 2 |
| --- | --- | --- |
| 1,3-propanediol diluted concentrate |  | 1.60 |
| Propylene glycol diluted concentrate | 1.60 |  |
| 1,3-propanediol | 98.40 |  |
| Propylene glycol |  | 98.40 |

A 15 gram sample was weighed into a 4 oz vessel and analyzed at 1.5 hrs. of equilibration time as described in the method of Example 4. The results are shown below in Table 11, where "Z" indicates that 1,3-propanediol had higher equilibrium maximum (meaning more of the flavor was released in 1,3-propanediol), "P" indicates that propylene glycol had higher equilibrium maximum, and "-" indicates no statistical difference (95% significance) between the two samples.

Because it was determined that ethanol is difficult to quantify in the H3O+ mode and is believed to be better quantified in the NO+ mode (not used in this experiment), the data was not believed to be reliable and is not included in the analysis.

TABLE 11

| Compound | Release Differences |
| --- | --- |
| Acetaldehyde | Z |
| Acetic acid | P |
| Isovaleradehyde | — |
| Butyric acid | — |
| Hexanol | Z |
| Benzaldehyde | P |
| Furfuryl mecaptan | — |
| Ethyl butyrate | Z |
| Guiacol | — |
| Octanal | — |
| Octanol | P |
| Tetramethyl pyrazine | Z |
| Limonene | Z |
| Butyl butyrate | Z |
| Citral | — |
| Decanoic acid | — |

This experiment (hereinafter the "solvent/solvent" experiment) demonstrated that there were significant differences in the release of many of the compounds of interest when mixed in 1,3-propanediol versus propylene glycol. It was hypothesized that the relative vapor pressures of the compounds in the headspace for each solvent could possibly be used to predict the equilibrium headspace concentrations in the corresponding water-solvent system (such as described in Example 4 where the flavor concentrates were diluted in water, hereinafter the "water/solvent" experiment).

To investigate this, the solvent/solvent results were compared to the water/solvent results of Example 4. When comparing which solvent resulted in the highest flavor release into the headspace for each compound, there were more contradictions than correlations between the solvent/solvent data and the water/solvent data. For example, acetaldehyde released faster (as evidenced by higher headspace concentration) in 1,3-propanediol in the solvent/solvent experiment but released faster in propylene glycol in the corresponding water/solvent experiment. In another example, hexanol released faster in 1,3-propanediol in the solvent/solvent experiment but there was no significant difference between 1,3-propanediol and propylene glycol in the corresponding water/solvent experiment. In a third example, octanol showed no significant difference in 1,3-propanediol versus propylene glycol in the solvent/solvent experiment but released faster in propylene glycol in the corresponding water/solvent experiment. In a fourth example, limonene released faster in 1,3-propanediol than in the propylene glycol in the solvent/solvent experiment, but there was no significant difference at the 95% confidence interval between propylene glycol versus 1,3-propanediol in the corresponding water/solvent experiment.

The results demonstrate that the relative equilibrium headspace concentrations of the flavor compounds resulting singularly from 1,3-propanediol or propylene glycol, while significantly different from each other for several compounds, do not fully correlate with, nor fully predict, the effects of the solvents in the more complicated water/solvent system. Therefore, it was concluded that the vapor pressure of the singular flavor compounds in the headspace in equilibrium with the solvent cannot be used to explain or predict the different flavor release in propylene glycol versus 1,3-propanediol in water/solvent systems as described in the examples herein.

Example 6

Samples were prepared to analyze and determine if 1,3-propanediol imparted any flavor when used at low concentrations. Sample A was a water only control. Sample B included 99.86 grams water and 0.14 grams 1,3-propanediol. Sample C included 90.0 grams water and 10 grams sucrose. Sample D included 89.86 grams water, 10 grams sucrose and 0.14 grams 1,3-propanediol. The samples were evaluated by a team of four tasters.

Samples A and B were compared. Only one of the four tasters could identify the 1,3-propanediol in a triangle test. Samples C and D were also compared with only one taster identifying the 1,3-propanediol in a triangle test. This demonstrated that 1,3-propanediol is generally not detectable at low levels in water or sucrose sweetened beverages.

Example 7

Samples were prepared to evaluate the effect of inclusion of 1,3-propanediol with acetic acid. Sample M included 0.05 percent acetic acid in water, Sample N included 0.05 percent acetic acid in water with 0.3 percent 1,3-propanediol, and Sample 0 included 0.05 percent acetic acid in water with 0.3 percent propylene glycol. The samples were evaluated by a team of three tasters.

Each of the three testers indicated that Sample 0 was the least sour, Sample N was more sour than Sample O, and Sample M was the most sour. Therefore, it is believed that 1,3-propanediol increases the sourness compared to water when combined with acetic acid.

Example 8

Samples were prepared to evaluate the effect of inclusion of 1,3-propanediol with citric acid. Sample S included 0.1 weight percent citric acid and 0.3 weight percent 1,3-propanediol in water. Sample T included 0.1 weight percent citric acid and 0.3 weight percent propylene glycol in water. Sample U included 0.1 weight percent citric acid in water. The samples were then evaluated by a team of three tasters.

The three tasters listed the samples in order of decreasing sourness:
Taster 1—U/S/T
Taster 2—T/U/S
Taster 3—T/U/S Example 9

Samples were prepared to evaluate the effect of including 1,3-propanediol with a higher concentration of citric acid than in Example 8. Sample V included 1 weight percent citric acid and 0.3 weight percent propylene glycol in water. Sample W included 1 weight percent citric acid in water. Sample X included 1 weight percent citric acid in water with 0.3 weight percent 1,3-propanediol. The samples were then evaluated by a team of four tasters.

Taster 1 indicated that Sample W was the most mild tasting and Sample X was less sour than Sample V.

Taster 2 indicated that Sample V and Sample X were similar with Sample W being milder.

Taster 3 indicated that Sample W was less sour than Samples V and X.

Taster 4 indicated that Sample W was the most mellow with Sample V being slightly less sour than Sample X.

Therefore, it is believed that 1,3-propanediol increased sourness perception when combined with citric acid.

Example 10

Samples were prepared to evaluate the effect of including 1,3-propanediol with malic acid. Sample Y included 1 weight percent malic acid with 0.3 weight percent 1,3-propanediol in water. Sample Z included 1 weight percent malic acid and 0.3 weight percent propylene glycol in water. Sample AA included 1 weight percent malic acid in water.

Taster 1 indicated that Sample Y was less sour than the other samples.

Taster 2 indicated that Sample Y had an initial sourness, but Samples Z and AA were more sour overall.

Taster 3 indicated that Sample Y was less sour than the other samples.

Taster 4 indicated that Sample Y had the most upfront sourness while Samples Z and AA were lingering.

Therefore, it was found that malic acid was more sour upfront but less lingering when included in combination with 1,3-propanediol. It is further found that, 1,3-propanediol may modify the acid perception, such as intensity and/or timing, in the flavor profile relative to a similar food or beverage which does not contain 1,3-propanediol.

Example 11

Samples were prepared to evaluate the effect of including 1,3-propanediol with tea. Six earl grey tea bags were combined with 250 ml of water for 30 minutes. Sample AB included 0.3 weight percent 1,3-propanediol in the steeped tea and Sample AD included 0.3 weight percent propylene glycol in the steeped tea. Sample AC was a tea only control. The samples were evaluated by a team of four tasters.

Taster 1 indicated that Sample AB had the least intense flavor, was the least bitter and was the least sour. Sample AC was the most sour and astringent.

Taster 2 indicated that Sample AB was the most sour, least bitter, and most astringent. Sample AD was more bitter, less astringent and less sour than Sample AB. In Sample AC, bitter dominated.

Taster 3 indicated that Sample AB was very astringent, the least bitter, and the least sour. Sample AC was bitter and astringent with no sour flavor. Sample AD had a strong bitter flavor, was in the middle for astringent and the most sour.

Taster 4 indicated that Sample AB was floral, bitter with a mild astringency. Sample AC was more astringent and sour. Sample AD was more astringent and bitter.

Therefore, it is believed that when tea is combined with 1,3-propanediol, the flavor profile improved the base with sour, bitter, and astringent characteristics all changed.

Example 12

Samples were prepared to evaluate the effect of including 1,3-propanediol with coffee. Robusta instant coffee was prepared with 1 weight percent coffee in water. Sample AE included 0.3 weight percent propylene glycol in the prepared coffee. Sample AF was a coffee only control. Sample AG included 0.3 weight percent 1,3-propanediol in the prepared coffee.

Taster 1 indicated that Sample AE was less sour with Sample AF was in the middle for sour and more bitter. Sample AG was the most metallic.

Taster 2 indicated that all samples were bitter with Sample AF being the least bitter and Sample AF the most bitter.

Taster 3 indicated that Sample AE was sour and bitter while Sample AF was more coffee like with some astringency. Sample AG was less sour and less bitter.

Taster 4 indicated that Sample AE was sour, astringent and ashy. Sample AF was more roasted and slightly more bitter but less sour. Sample AG was ashy, sour and less bitter.

Therefore, it is believed that when coffee is combined with 1,3-propanediol, the flavor profile is less bitter than without 1,3-propanediol.

Example 13

Samples were prepared to evaluate the effect of including 1,3-propanediol with orange juice. An orange juice only control was compared to Sample AJ that included 0.3 weight percent 1,3-propanediol in the orange juice. All three tasters indicated Sample AJ was less bitter, sweeter and rounded at the end.

Example 14

Samples were prepared to evaluate the effect of including 1,3-propanediol with lactic acid. Sample P included 0.25 weight percent lactic acid and 0.3 weight percent 1,3-propanediol in water. Sample Q included 0.25 weight percent lactic acid and 0.3 weight percent propylene glycol in water. Sample R included 0.25 weight percent lactic acid in water. The samples were then evaluated by a team of five tasters. The tasters listed the samples in order of decreasing sourness.

Taster 1—R/Q/P, with Sample R being more sour and astringent.

Taster 2—R/Q/P, with Sample R being metallic, salty and astringent; Sample Q being sharper and astringent, bitter.

Taster 3—R/P/Q—Sample Q had a slight plastic and bitter taste.

Taster 4—R/P/Q

Taster 5—Samples R and Q had medicinal metallic taste and were more sour, Sample P was smoother and less sour astringent.

Example 15

Samples were prepared to evaluate the effect of 1,3-propanediol with dark chocolate cream cheese. A dark chocolate cream cheese control was compared to Sample AH that further included 0.5 weight percent 1,3-propanediol. The samples were then evaluated by a team of five tasters. All five tasters indicated that Sample AH had a more dark cocoa flavor and a more alkalize cocoa flavor than the control.

Example 16

Samples were prepared to evaluate the effect of 1,3-propanediol with soybean oil. A control oil (20% oil, 1% carboxymethylcellulose, and 0.3 weight percent quiala extract emulsifier) was compared to Sample AI that further included 0.3 weight percent 1,3-propanediol. All five tasters indicated that Sample AI was less grassy and wheaty flavored than the control.

Example 17

Samples were prepared to evaluate the effect of 1,3-propanediol with 2% milk. A 2% milk control was compared to Sample AK that further included 0.2 weight percent 1,3-propanediol. All tasters indicated that Sample AK was less fatty, more sweet and less sour.

The foregoing descriptions are not intended to represent the only forms of the food and beverage products containing 1,3-propanediol and methods of impacting flavor release in food and beverage products. The percentages provided herein are by weight unless stated otherwise. Changes in form and in proportion of parts, as well as the substitution of equivalents, are contemplated as circumstances may suggest or render expedient. Similarly, while food or beverages and methods have been described herein in conjunction with specific embodiments, many alternatives, modifications, and variations will be apparent to those skilled in the art in light of the foregoing description.

What is claimed is:

1. A method for suppressing flavor release in a beverage product, the method comprising preparing a beverage product comprising 1,3-propanediol in an amount effective to provide a ratio of a flavor compound to 1,3-propanediol in the beverage product of 0.05:100 to 5:100 to suppress release of the flavor compound from the beverage product, wherein the flavor compound is selected from the group consisting of decanoic acid, acetaldehyde, octanal, citral, octanol, hexanol, benzaldehyde, limonene, guaiacol, and tetramethyl pyrazine.

2. The method according to claim 1, wherein suppressing release of the flavor compound is suppression of release of the flavor compound by at least 10 percent as determined by PTR-MS as compared to an otherwise identical beverage product comprising propylene glycol instead of 1,3-propanediol in the same ratio to the flavor compound, and wherein percent suppression is calculated according to formula I, $$(I_Z - I_{PG})/I_{PG} \times 100, \qquad \text{(formula I)}$$

where I is peak height, Z is 1,3-propanediol, and PG is propylene glycol.

3. The method according to claim 1, wherein the beverage product is selected from the group consisting of beverage, powdered beverage, and beverage concentrate.

4. The method according to claim 3, wherein the beverage product is a beverage concentrate.

5. The method according to claim 1, wherein 1,3-propanediol is included in an amount of about 0.1 to about 1 percent by weight of the beverage product.

6. The method according to claim 1, wherein 1,3-propanediol is included in an amount of about 0.1 to about 0.5 percent by weight of the beverage product.

7. The method according to claim 2, wherein the suppressing release of the flavor compound is suppression of flavor release by at least 20 percent.

8. The method according to claim 2, wherein the suppressing release of the flavor compound is suppression of flavor release by at least 30 percent.

9. A beverage product comprising at least one flavor compound and 1,3-propanediol, the 1,3-propanediol included in an amount effective to provide a ratio of a flavor compound to 1,3-propanediol of 0.05:100-to 5:100 and the amount of 1,3-propanediol effective to suppress the release of the flavor compound, wherein the flavor compound is selected from the group consisting of decanoic acid, acetaldehyde, octanal, citral, octanol, hexanol, benzaldehyde, limonene, guaiacol, and tetramethyl pyrazine.

10. The beverage product according to claim 9, wherein the beverage product is selected from the group consisting of beverage, powdered beverage, and beverage concentrate.

11. The beverage product according to claim 10, wherein the beverage product is a beverage concentrate.

12. The beverage product according to claim 9, wherein 1,3-propanediol is included in an amount of about 0.1 to about 1 percent by weight of the beverage product.

13. The beverage product according to claim 9, wherein 1,3-propanediol is included in an amount of about 0.1 to about 0.5 percent by weight of the beverage product.

14. The beverage product according to claim 9, wherein the suppressing release of the flavor compound is suppression of release of the flavor compound by at least 10 percent as determined by PTR-MS as compared to an otherwise identical beverage product comprising propylene glycol instead of 1,3-propanediol in the same ratio to the flavor compound, and wherein percent suppression is calculated according to formula I, $$(I_Z - I_{PG})/I_{PG} \times 100, \qquad \text{(formula I)}$$

where I is peak height, Z is 1,3-propanediol, and PG is propylene glycol.

15. The beverage product according to claim 14, wherein the suppressing release of the flavor compound is suppression of flavor release by at least 20 percent.

16. The beverage product according to claim 14, wherein the suppressing release of the flavor compound is suppression of flavor release by at least 30 percent.

* * * * *